(12) United States Patent
Yanik et al.

(10) Patent No.: US 8,558,043 B2
(45) Date of Patent: Oct. 15, 2013

(54) MODULAR BIOMASS TREATMENT UNIT

(75) Inventors: Steve Yanik, Colorado Springs, CO (US); Paul O'Connor, Hoevelaken (NL); Robert Bartek, Centennial, CO (US)

(73) Assignee: KiOR, Inc., Pasadena, TX (US)

( * ) Notice: Subject to any disclaimer, the term of this patent is extended or adjusted under 35 U.S.C. 154(b) by 828 days.

(21) Appl. No.: 12/717,744

(22) Filed: Mar. 4, 2010

(65) Prior Publication Data

US 2010/0281759 A1 Nov. 11, 2010

Related U.S. Application Data

(60) Provisional application No. 61/157,342, filed on Mar. 4, 2009.

(51) Int. Cl.
*C07C 1/00* (2006.01)
*C10G 1/10* (2006.01)

(52) U.S. Cl.
USPC ............. 585/240; 585/242; 44/605; 202/117; 202/118; 202/235; 202/262

(58) Field of Classification Search
USPC ...................... 585/14, 240, 241; 44/605, 606; 202/118, 117, 262, 235
See application file for complete search history.

(56) References Cited

U.S. PATENT DOCUMENTS

| | | | |
|---|---|---|---|
| 3,961,913 A | 6/1976 | Brenneman et al. | |
| 4,064,018 A | 12/1977 | Choi | |
| 4,147,593 A | 4/1979 | Frischmuth et al. | |
| 4,153,514 A | 5/1979 | Garrett et al. | |
| 4,266,083 A | 5/1981 | Huang | |
| 4,308,411 A | 12/1981 | Frankiewicz | |
| 4,711,873 A | 12/1987 | Suzukamo et al. | |
| 4,851,601 A | 7/1989 | Fukuda et al. | |
| 4,874,507 A | 10/1989 | Whitlock | |
| 4,987,114 A | 1/1991 | Suzukamo et al. | |
| 5,064,527 A | 11/1991 | Singhal et al. | |
| 5,097,088 A | 3/1992 | Fukao et al. | |

(Continued)

FOREIGN PATENT DOCUMENTS

| | | |
|---|---|---|
| CA | 1283880 | 5/1991 |
| CA | 2618000 A1 | 2/2007 |

(Continued)

OTHER PUBLICATIONS

WO2005067694 which is equivalent to DE 102004003011 and EP1742525, Machine Translation.*

(Continued)

*Primary Examiner* — Nina Bhat
(74) *Attorney, Agent, or Firm* — Dunlap Codding, P.C.

(57) ABSTRACT

A modular biomass treatment unit includes a first module having a pretreater and a first frame for transportation to and operation at a site adjacent to a solid biomass growth source. The pretreater is operable to process solid biomass to produce a plurality of solid biomass particles for conversion into a fuel or specialty chemical. The first frame supports the pretreater during transportation to and operation at the site adjacent to the solid biomass growth source. The modular biomass treatment unit can also include additional modules each comprising a reactor, a separator, and a frame for transportation to and operation at a site such as the site adjacent to the solid biomass growth source.

27 Claims, 6 Drawing Sheets

(56) References Cited

U.S. PATENT DOCUMENTS

| | | | |
|---|---|---|---|
| 5,102,628 | A | 4/1992 | De Lasa |
| 5,115,084 | A | 5/1992 | Himmelblau |
| 5,233,109 | A | 8/1993 | Chow |
| 5,504,259 | A | 4/1996 | Diebold et al. |
| 5,599,510 | A | 2/1997 | Kaminsky et al. |
| 5,728,271 | A | 3/1998 | Piskorz et al. |
| 5,792,340 | A | 8/1998 | Freel et al. |
| 5,865,898 | A | 2/1999 | Holtzapple et al. |
| 5,959,167 | A | 9/1999 | Shabtai et al. |
| 5,961,786 | A | 10/1999 | Freel et al. |
| 6,022,419 | A | 2/2000 | Torget et al. |
| 6,069,012 | A | 5/2000 | Kayser |
| 6,248,297 | B1 | 6/2001 | Stine et al. |
| 6,485,774 | B1 | 11/2002 | Bransby |
| 6,702,948 | B1 * | 3/2004 | Oberlander ............... 210/695 |
| 6,814,940 | B1 | 11/2004 | Hiltunen et al. |
| 6,830,597 | B1 | 12/2004 | Green |
| 6,971,594 | B1 | 12/2005 | Polifka |
| 7,044,999 | B2 | 5/2006 | Bankstahl et al. |
| 7,202,389 | B1 | 4/2007 | Brem |
| 7,262,331 | B2 | 8/2007 | Van de Beld et al. |
| 7,341,973 | B2 | 3/2008 | Flego et al. |
| 7,503,981 | B2 | 3/2009 | Wyman et al. |
| 7,931,784 | B2 * | 4/2011 | Medoff ................ 204/157.63 |
| 7,932,065 | B2 * | 4/2011 | Medoff ...................... 435/165 |
| 8,167,959 | B2 * | 5/2012 | Copp et al. ................. 44/605 |
| 8,168,044 | B2 * | 5/2012 | Weigelt ........................ 202/83 |
| 8,206,471 | B1 * | 6/2012 | Tharpe, Jr. ................ 48/197 R |
| 8,304,590 | B2 * | 11/2012 | Hopkins et al. ............ 585/240 |
| 2004/0180971 | A1 | 9/2004 | Inoue et al. |
| 2005/0145542 | A1 | 7/2005 | O'Connor et al. |
| 2007/0000177 | A1 | 1/2007 | Hippo et al. |
| 2007/0213573 | A1 | 9/2007 | Ross et al. |
| 2008/0009055 | A1 | 1/2008 | Lewnard |
| 2009/0013601 | A1 | 1/2009 | Mandich et al. |
| 2009/0043686 | A1 * | 2/2009 | Matsumoto ................... 705/37 |
| 2009/0081743 | A1 * | 3/2009 | Hazelbeck et al. ......... 435/157 |
| 2009/0093555 | A1 | 4/2009 | Stites et al. |
| 2009/0139851 | A1 | 6/2009 | Freel |
| 2009/0165378 | A1 | 7/2009 | Agblevor |
| 2009/0227823 | A1 | 9/2009 | Huber et al. |
| 2010/0081835 | A1 * | 4/2010 | Wu et al. ......................... 554/8 |

FOREIGN PATENT DOCUMENTS

| | | |
|---|---|---|
| DE | 202006012176 | 12/2006 |
| EP | 1719811 A1 | 11/2006 |
| EP | 1852466 A1 | 11/2007 |
| EP | 1852490 A1 | 11/2007 |
| EP | 1852492 A1 | 11/2007 |
| EP | 1878783 A1 | 1/2008 |
| EP | 2105486 A1 | 9/2009 |
| EP | 2107100 A1 | 10/2009 |
| WO | WO81/01713 A1 | 6/1981 |
| WO | WO02/14040 A1 | 2/2002 |
| WO | WO02/083816 A1 | 10/2002 |
| WO | WO2005067694 * | 7/2005 |
| WO | WO2006/117006 A1 | 11/2006 |
| WO | WO2007/128798 A1 | 11/2007 |
| WO | WO2007/128799 A1 | 11/2007 |
| WO | WO2007/128800 A1 | 11/2007 |
| WO | WO2008/009643 A2 | 1/2008 |
| WO | WO2008/011598 A2 | 1/2008 |
| WO | WO2008/101949 A1 | 8/2008 |
| WO | WO2009/118352 A1 | 10/2009 |
| WO | WO2009/143017 A1 | 11/2009 |
| WO | WO2010/002792 A2 | 1/2010 |

OTHER PUBLICATIONS

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002, pp. 2087-2095, XP004374414, ISSN: 0016-2361.

Huber, George, W., et al. "Synthesis of Transportation Fuels From Bomass: Chemistry, Catalysts and Engineering" Chem.Rev.,; Chemical Reviews, Sep. 2006, vol. 106, No. 9, pp. 40-44-4098, 4047-4048, 4061-4063, 4085, 4092-4093, XP002490759.

McKendry, P., "Energy Production From Biomass," Bioresource Technology 83 (2002) p. 37-46.

Wyman, et al, "Coordinated Development of Leading Biomass Pretreatment Technologies" Bioresource Technology 96 (2005) 1959-1966.

Bridgwater, A.V. "Principles and Practice of Biomass Fast Pyrolysis Processes for Liquids" Journal of Analytical and Applied Pyrolysis, Jul. 1999 vol. 51, pp. 3-22, p. 15, para 4 to p. 16 para 2; p. 18, para 2.

Bridgwater, A.V., et al, "Fast Pyrolysis Processes for Biomass," Renewable and Sustainable Energy Reviews 4 (2000) 1-73.

* cited by examiner

MODULAR BIOMASS TREATMENT UNIT

FIELD OF THE INVENTION

The invention relates to producing a fuel or specialty chemical product from biomass through a chemical process. The invention relates more particularly to preparing solid biomass for catalytic conversion and to deoxygenating, catalytically cracking, and converting the biomass into a fuel or specialty chemical product in a modular biomass treatment unit.

BACKGROUND OF THE INVENTION

Biomass, in particular biomass of plant origin, is recognized as an abundant potential source of fuels and, specialty chemicals. See, for example, "Energy production from biomass," by P. McKendry—Bioresource Technology 83 (2002) P 37-46 and "Coordinated development of leading biomass pretreatment technologies" by Wyman et al, Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Producing fuels and specialty chemicals from biomass can require specialized conversion processes and/or refineries, which are distinct from and incompatible with conventional petroleum-based conversion processes and refineries. Thus, the wide-spread use and implementation of biomass to produce fuels and specialty chemicals faces many challenges, because large-scale production facilities are not widely available and are expensive to build. Furthermore existing processes can require extreme conditions (e.g., high temperature and/or pressure, which increases capital and operating costs), require expensive catalysts, suffer low conversion efficiency (e.g., incomplete conversion or inability to convert lingo- and hemi-cellulosic material), and/or suffer poor product selectivity. When these processes are described, they are part of stand-alone bio-refineries or integrated within or very close to existing oil refineries. While there are many advantages of such processing schemes, they are not always optimum.

BRIEF SUMMARY OF THE INVENTION

In various embodiments the invention includes methods, apparatuses, kits, and compositions for converting cellulosic (e.g., including ligno- and hemi-cellulosic) material in biomass (e.g., including edible and inedible portions) into fuels and/or specialty chemicals under conditions that can mitigate equipment cost, energy cost, and/or degradation or undesirable reaction of conversion product. Examples of fuels include light gases (e.g., ethane, propane, butane), naphtha, and distillates (e.g., jet fuel, diesel, heating oil). Examples of chemicals include light olefins (e.g., ethylene, propylene, butylenes), acids (e.g., formic and acetic), aldehydes, alcohols (e.g., ethanol, propanol, butanol, phenols), ketones, furans, and the like. For example, the invention includes preparing solid biomass particles for catalytic conversion, which can improve conversion of the biomass into fuels and/or specialty chemicals in conventional petroleum refining processes (e.g., known petrochemical refining units). The invention also includes adapting existing refinery processes for processing biomass (e.g., change operating parameters, catalyst, and feedstock), retrofitting existing refinery process units for processing biomass (e.g., adding an extra riser for biomass catalytic cracking or adding a solid biomass feeder system to introduce biomass), and constructing new, purpose-built biomass reactors (e.g., employ commercially available conventional reactor components). Thus, the methods, apparatuses, kits, and compositions can reduce the cost and increase the availability of fuel and/or specialty chemicals derived from biomass.

In one aspect, the invention features a modular biomass treatment unit including a first module comprising a pretreater and a first frame for transportation to and operation at a site adjacent to a solid biomass growth source. The pretreater is operable to process solid biomass to produce a plurality of solid biomass particles for conversion into a fuel or specialty chemical. The first frame supports the pretreater during transportation to and operation at the site, adjacent to the solid biomass growth source.

In another aspect, the invention features a method for treating solid biomass at one or more sites adjacent to a solid biomass growth source. The method includes receiving one or more first modules, each module comprising a pretreater supported by a frame, at one or more sites adjacent to a solid biomass growth source. The method also includes connecting the one or more first modules to utilities at the one or more sites adjacent to the solid biomass growth source. The method also includes processing solid biomass from the solid biomass growth source in the one or more pre-treaters supported by first frames, to produce a plurality of solid biomass particles for conversion into a fuel or specialty chemical.

In another aspect, the invention features a method for treating solid biomass at a site adjacent to a solid biomass, growth source. The method includes receiving a first module comprising a pretreater supported by a first frame at a site adjacent to a solid biomass growth source. The method also includes connecting the first module to utilities at the site adjacent to the solid biomass growth source. The method also includes processing solid biomass from the solid biomass growth source in the pretreater supported by the first frame, to produce a plurality of solid biomass particles for conversion into a fuel or specialty chemical.

In another aspect, the invention features a method for treating solid biomass from a solid biomass growth source. The method includes receiving a first module comprising a pretreater supported by a first frame at a first site adjacent to a first sector of a solid biomass growth source; connecting the first module to utilities at the first site; and processing solid biomass from the first sector in the pretreater to produce a first plurality of solid biomass particles for conversion into a fuel or specialty chemical. The method also includes receiving the first module at a second site adjacent to a second sector of the solid biomass growth source; connecting the first module to utilities at the second site; and processing solid biomass from the second sector in the pretreater to produce a second plurality of solid biomass particles for conversion into a fuel or specialty chemical.

In another aspect, the invention features a method for treating solid biomass from a solid biomass growth source. The method includes receiving a first module comprising a first pretreater supported by a first frame at a first site adjacent to a first sector of a solid biomass growth source; connecting the first module to utilities at the first site; and processing solid biomass from the first sector in the first pretreater, to produce a first plurality of solid biomass particles for conversion into a fuel or specialty chemical. The method also includes receiving the second module comprising a second pretreater supported by a second frame at a second site adjacent to a second sector of the solid biomass growth source; connecting the second module to utilities at the second site; processing solid biomass from the second sector in the second pretreater, to produce a second plurality of solid biomass particles for conversion into a fuel or specialty chemical; and receiving the first and second plurality of solid biomass particles in a reactor, deoxygenating the plurality of solid biomass particles in the reactor to produce a liquefied product.

In another aspect, the invention features a water-based biomass treatment unit for converting algae or other aquatic biomass into a biocrude at a site adjacent to an aquatic biomass source. The treatment unit includes a first module comprising a pretreater and a first frame for transportation to and operation at a site adjacent to an aquatic biomass source. The pretreater is operable to process aquatic biomass to produce an aquatic biomass preparation for conversion into a biocrude and the first frame supports the pretreater during transportation to and operation at the site adjacent to the aquatic biomass source. The treatment unit also includes a second module comprising a reactor, a separator, and a second frame for transportation to and operation at the site adjacent to the aquatic biomass source. The reactor is operable to deoxygenate the aquatic biomass preparation, to produce a liquefied product; the separator is operable to separate a biocrude for conversion into a fuel or specialty chemical from the liquefied product; and the second frame supports the reactor and separator during transportation to and operation at the site adjacent to the aquatic biomass source.

In another aspect, the invention features a battlefield-based biomass treatment unit for converting biomass into a biocrude at a site adjacent to a battlefield. The treatment unit includes a first module comprising a pretreater and a first frame for transportation to and operation at a site adjacent to a battlefield. The pretreater is operable to process biomass to produce a biomass preparation for conversion into a biocrude and the first frame supports the pretreater during transportation to and operation at the battlefield. The treatment unit also includes a second module comprising a reactor, a separator, and a second frame for transportation to and operation at the battlefield. The reactor is operable to deoxygenate the biomass preparation, to produce a liquefied product; the separator is operable to separate a biocrude for conversion into a fuel or specialty chemical from the liquefied product; and the second frame supports the reactor and separator during transportation to and operation at the battlefield.

In other examples, any of the aspects above, or any method, apparatus, or composition of matter described herein, can include one or more of the following features. Method steps can be performed in the order presented, as well as in any other combinations or iterations.

In various embodiments, the pretreater includes a contactor adapted for one or more of forming a mechano-chemical interaction between at least a portion of the solid biomass particles and a catalyst, and impregnating at least a portion of the solid biomass particles with a catalyst.

In some embodiments, the pretreater includes one or more of a demineralizer adapted for removing minerals from the solid biomass, and a dryer adapted for dewatering and torrifying the solid biomass.

In certain embodiments, the modular biomass treatment unit includes a solid biomass harvester.

In various embodiments, the first module includes skids and is sized to fit within one or more shipping containers. Alternatively, any of the modules and/or units can be in the form of a shipping container.

In some embodiments, the modular biomass treatment unit includes a second module comprising a reactor, a separator, and a second frame for transportation to and operation at the site adjacent to the solid biomass growth source. The reactor is operable to deoxygenate the plurality of solid biomass particles, to produce a liquefied product; the separator is operable to separate a biocrude for conversion into a fuel or specialty chemical from the liquefied product; and the second frame supports the reactor and separator during transportation to and operation at the site adjacent to the solid biomass growth source.

In certain embodiments, the second module includes a coupling mechanism for detachably engaging with the first module, includes skids, and is sized to fit within one or more shipping containers.

In various embodiments, the modular biomass treatment unit includes a third module comprising a second reactor, a second separator, and a third frame for transportation to and operation at the site adjacent to the solid biomass growth source. The second reactor is operable to refine the biocrude to produce a refined product, deoxygenate remaining solid biomass to produce additional liquefied product, or both refine the biocrude and deoxygenate remaining solid biomass. The second separator is operable to separate a fuel or specialty chemical from the refined product, separate a biocrude for conversion into a fuel or specialty chemical from the liquefied product, or both separate a fuel or specialty chemical and separate a biocrude. Furthermore, the third frame supports the second reactor and the second separator during transportation to and operation at the site adjacent to the solid biomass growth source.

In some embodiments, the third module includes a coupling mechanism for detachably engaging with one or more of the first module and the second module, comprises skids, and is sized to fit within one or more shipping containers.

In certain embodiments, the method includes processing the plurality of solid biomass particles and a catalyst in a conventional petroleum refinery unit, where the catalyst and the unit are each adapted for processing solid biomass particles. Alternatively, the method can include co-processing the plurality of solid biomass particles, a catalyst, and a conventional petroleum-based feedstock in a conventional petroleum refinery unit, wherein the catalyst and the unit are each adapted for co-processing solid biomass particles and a conventional petroleum based feedstock.

In various embodiments, the method includes (i) receiving a second module comprising a reactor and a separator supported by a second frame at a second site, the second site adjacent to the solid biomass growth source or adjacent to a petroleum refinery; (ii) connecting the second module to utilities at the second site; (iii) deoxygenating the plurality of solid biomass particles in the reactor supported by the second frame to produce a liquefied product; and (iv) separating a biocrude for conversion into a fuel or specialty chemical from the liquefied product in the separator supported by the second frame.

In some embodiments, the method includes (i) receiving a third module comprising a second reactor and a second separator supported by a third frame at the second site; (ii) connecting the third module to utilities at the second site; (iii) refining the biocrude in the second reactor supported by the third frame to produce a refined product, deoxygenating remaining solid biomass particles in the reactor supported by the second frame to produce additional liquefied product, or both refining the biocrude and deoxygenating remaining solid biomass particles; and (iv) separating a fuel or specialty chemical from the refined product in the second separator supported by the third frame, separating a biocrude for conversion into a fuel or specialty chemical from the liquefied product in the separator supported by the second frame, or both separating a fuel or specialty chemical and separating a biocrude.

In certain embodiments, the method includes (i) receiving a second module comprising a reactor and a separator supported by a second frame at the first site; (ii) connecting the second module to utilities at the first site; (iii) deoxygenating the first plurality of solid biomass particles in the reactor, to produce a first liquefied product; (iv) separating a first biocrude for conversion into a fuel or specialty chemical from the first liquefied product; (v) receiving the second module at the second site; (vi) connecting the second module to utilities at the second site; (vii) deoxygenating the second plurality of solid biomass particles in the reactor to produce a second liquefied product; and (viii) separating a second biocrude for conversion into a fuel or specialty chemical from the second liquefied product in the separator.

In various embodiments, the water-based biomass treatment unit includes (i) a third module comprising a second reactor, a second separator, and a third frame for transportation to and operation at the site adjacent to the aquatic biomass; (ii) wherein the second reactor is operable to refine the biocrude to produce a refined product, deoxygenate remaining aquatic biomass preparation to produce additional liquefied product, or both refine the biocrude and deoxygenate remaining aquatic biomass preparation; (iii) wherein the second separator is operable to separate a fuel or specialty chemical from the refined product, separate a biocrude for conversion into a fuel or specialty chemical from the liquefied product, or both separate a fuel or specialty chemical and separate a biocrude; and (iv) wherein the third frame supports the second reactor and the second separator during transportation to and operation at the site adjacent to the aquatic biomass source.

In some embodiments, the battlefield-based biomass treatment unit includes (i) a third module comprising a second reactor, a second separator, and a third frame for transportation to and operation at the battlefield; (ii) wherein the second reactor is operable to refine the biocrude to produce a refined product, deoxygenate remaining biomass preparation to produce additional liquefied product, or both refine the biocrude and deoxygenate remaining biomass preparation; (iii) wherein the second separator is operable to separate a fuel or specialty chemical from the refined product, separate a biocrude for conversion into a fuel or specialty chemical from the liquefied product, or both separate a fuel or specialty chemical and separate a biocrude; and (iv) wherein the third frame supports the second reactor and the second separator during transportation to and operation at the battlefield.

In certain embodiments, the modular biomass treatment unit includes a second module having a reactor and a second frame for transportation to and operation at the site adjacent to the solid biomass growth source. The reactor is operable to deoxygenate the plurality of solid biomass particles, to produce a liquefied product. The second frame supports the reactor during transportation to and operation at the site adjacent to the solid biomass growth source.

In various embodiments, the modular biomass treatment unit includes a third module having a second reactor and a third frame for transportation to and operation at the site adjacent to the solid biomass growth source. The second reactor is operable to refine the biocrude to produce a refined product, deoxygenate remaining solid biomass to produce additional liquefied product, or both refine the biocrude and deoxygenate remaining solid biomass. The third frame supports the second reactor during transportation to and operation at the site adjacent to the solid biomass growth source.

In some embodiments, the method includes: (i) receiving a second module comprising a reactor supported by a second frame at a second site, the second site adjacent to the solid biomass growth source or adjacent to a petroleum refinery; (ii) connecting the second module to utilities at the second site; and (iii) deoxygenating the plurality of solid biomass particles in the reactor supported by the second frame to produce a liquefied product.

In certain embodiments, the method includes: (i) receiving a third module comprising a second reactor supported by a third frame at the second site; (ii) connecting the third module to utilities at the second site; and (iii) refining the biocrude in the second reactor supported by the third frame to produce a refined product, deoxygenating remaining solid biomass particles in the reactor supported by the second frame to produce additional liquefied product, or both refining the biocrude and deoxygenating remaining solid biomass particles.

In various embodiments, the method includes: (i) receiving a second module comprising a reactor supported by a second frame at the first site; (ii) connecting the second module to utilities at the first site; (iii) deoxygenating the first plurality of solid biomass particles in the reactor, to produce a first liquefied product; (iv) receiving the second module at the second site; (v) connecting the second module to utilities at the second site; and (vi) deoxygenating the second plurality of solid biomass particles in the reactor to produce a second liquefied product.

In some embodiments, the method includes separating a biocrude for conversion into a fuel or specialty chemical from the liquefied product. Processing biomass can include roasting or toasting biomass.

In certain embodiments, the pretreater includes a vessel for roasting or toasting biomass.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
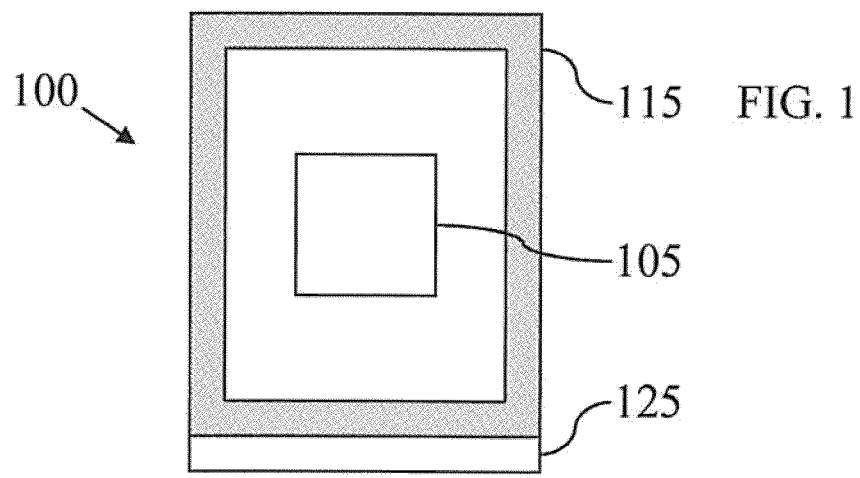
FIG. 1 illustrates a sectional view of an exemplary first module, including a pretreater and a first frame, for transportation to and operation at a site adjacent to a solid biomass growth source.

The invention relates to preparing solid biomass for catalytic conversion and to deoxygenating, catalytically cracking, and converting the biomass into a fuel or specialty chemical product in one more modular biomass treatment units. The invention includes modular biomass treatment units and methods for setting up and using such units for converting solid biomass into fuels and/or specialty chemicals under conditions that can mitigate equipment cost (e.g., units may be standardized and may be easier to set up than conventional units) and energy cost (e.g., by operating at lower temperatures and/or with fewer steps and/or by selecting a size/type of the unit based upon the biomass source and/or reducing feedstock and product transportation costs).

For example, biomass sources are often located great distances from existing refineries, which can make transportation of materials costly and inefficient. Furthermore, construction of large biomass treatment units close to the biomass source can also be difficult because of the lack of a sufficient amount of feedstock to support a conventional (e.g., large) scale treatment unit. A deficiency of water and/or other utilities, as well as existing environmental restrictions or lack of public support for large facilities close to the biomass source can also present barriers to using such biomass.

In circumstances where a conventional scale treatment unit is infeasible, inappropriate, or inefficient, a smaller, mobile, and/or modular treatment unit may be suitable. For example, one or more modular treatment units could be used for: (i) pretreating and densifying the biomass (e.g., reduce particle size, dry, toast, roast, and/or remove minerals) to make transportation cheaper and more efficient; (ii) pretreating and deoxygenating to liquefy the product (e.g., an energy dense liquid can be easier and more efficient to transport); and/or (iii) a conversion step to produce a biocrude from the liquefied product (e.g., suitable as a refinery process unit feedstock). In some cases, minerals and/or char from the treatment can be used locally as fertilizer (e.g., returned to the biomass source). The modular treatment units can be a staged set of units for assemble adjacent to a biomass source, to achieve any combination of the above steps. The modular treatment units can be customized and/or adapted for particular applications, such as forestry, agriculture, aquatic, military, and the like.

Solid Biomass Particles

In various embodiments, biomass includes materials of photosynthetic (e.g., plant) origin having cellulose, hemicellulose, and/or lignin. Biomass includes materials produced by photosynthetic conversion of carbon dioxide and water using solar energy. In general, biomass including cellulose, hemicellulose, and/or lignin originates from land plants. Some aquatic plants include little or no lignin. However, the invention is applicable to any biomass including any amount of cellulose, hemicellulose, and/or lignin. Biomass sources include, but are not limited to, cereal grains (e.g., including corn), grasses, sugar cane, trees, and the like. Biomass sources also include by-products of agricultural or forestry activities, such as straw, chopped straw, cotton linters, corn husks, corn stalks, corn cobs, wood chips, saw dust, bagasse, sugar beet pulp, tree bark, grasses, and the like. Biomass sources also include aquatic sources such as algae and seaweed.

Biomass sources can be used without requiring chemical pre-processing (e.g., chemically altering the biomass). In various embodiments, biomass sources include (chemically) unrefined material of photosynthetic origin. Biomass sources can be subjected to a drying and/or a particle size reduction step. Such a drying and/or a particle size reduction step does not significantly change the relative composition of the biomass in terms of cellulose, hemicellulose and/or lignin and therefore such a step is not necessarily considered refining.

In various embodiments, biomass feedstock can include particles that are solid and in a finely divided form (e.g., saw dust and ground straw). Biomass feedstock can include solid materials as well as materials that might be classified as liquids, but that have a very high viscosity (e.g., small or large colony algae). Biomass particles can be prepared from biomass sources and larger particles by techniques such as milling, grinding, pulverization, and the like. For example, biomass from sources such as straw and wood can be converted to particles in a size range of about 5 mm to about 5 cm using techniques such as milling or grinding.

Agitation of Biomass Particles

In various embodiments, the method includes agitating solid biomass particles, to reduce a size characterizing at least a portion of the particles. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser, or downer. A riser (up flow) or a downer (down flow) can be, for example, a hollow vertical vessel terminating in a larger diameter vessel, which houses high velocity (e.g., about 60-80 m/s or 18-24 m/s) cyclones that may or may not be physically connected to the riser termination point. The height of a riser or downer can be, for example, between about 15 ft (5 m) and about 60 ft (18 m) and the diameter can be, for example, between about 1 ft (0.3 m) and about 4 ft (1.2 m). Agitating can be facilitated by a gas (e.g., gas can convey the particles such that they are abraded or ground by other particles, catalyst, and/or inorganic particulate material). The gas can be one or more of air, steam, flue gas, carbon dioxide, carbon monoxide, hydrogen, and hydrocarbons, (e.g. methane). The gas can be a gas having a reduced level of oxygen (compared to air) or can be substantially oxygen-free. In another embodiment, an agitator can be a mill (e.g., ball or hammer mill) or kneader or mixer (e.g., for mechanical, as opposed to pneumatic, agitation).

In certain embodiments, agitating includes causing the solid biomass particles to be conveyed at a velocity of greater than about 1 m/s. For example, the velocity can be measured relative to a vessel in which the particles are conveyed. Agitating can include causing the solid biomass particles to move at a velocity of greater than about 10 m/s. Agitating can include causing at least a portion of the solid biomass particles to move at a velocity of greater than about 100 m/s. An agitator can be adapted to cause the solid biomass particles to move at a velocity of greater than about 1 m/s, greater than about 10 m/s, and/or greater than about 100 m/s. Other velocities include velocities of greater than about 5, 25, 50, 75, 125, 150, 175, 200, 225, and 250 m/s.

For example, the velocity is selected from the group consisting of between about 10 and about 20 m/s; between about 20 and about 30 m/s; between about 30 and about 40 m/s; between about 40 and about 50 m/s; between about 50 and about 60 m/s; between about 60 and about 70 m/s; between about 70 and about 80 m/s; between about 80 and about 90 m/s; and between about 90 and about 100 m/s. The velocity can be about 10 m/s, about 20 m/s, about 30 m/s, about 40 m/s, about 50 m/s, about 60 m/s, about 70 m/s, about 80 m/s, about 90 m/s, or about 100 m/s. The velocity can be greater than about 10 m/s, about 20 m/s, about 30 m/s, about 40 m/s, about 50 m/s, about 60 m/s, about 70 m/s, about 80 m/s, about 90 m/s, or about 100 m/s.

In various embodiments, agitating solid biomass particles, to reduce a size characterizing at least a portion of the particles, is facilitated by agitating solid biomass particles together with a material that is harder than the biomass. For example, the material can be a catalyst or another inorganic particulate material. The amount of size reduction, and thus the size of the resulting solid biomass particles can be modulated by the duration of agitation and the velocity of agitation. Other factors such as the relative hardness of the catalyst or another inorganic particulate material, the dryness (e.g., brittleness) of the solid biomass particles, and the method/vessel(s) in which agitation occurs also modulate the amount of size reduction.

In embodiments using an abrading or grinding material that is a catalyst, the catalyst can become embedded in the biomass particles, which can facilitate catalytic conversion of the biomass. In such embodiments, agitating can facilitate formation of a mechano-chemical interaction between at least a portion of the catalyst and at least a portion of the solid biomass particles, which can facilitate catalytic conversion of the biomass.

Agitation can be carried out at an elevated temperature, for drying the biomass. An elevated temperature can be a temperature sufficient to dry the biomass, for example, between about 50 and about 150° C., or below about 200° C. Higher temperatures can be used, for example, where an agitating gas is oxygen-poor or substantially oxygen-free. Agitation can also be carried out at ambient temperature with dried biomass. Drying increases the hardness of the biomass particles, making the particles more susceptible to size reduction.

Agitation can be carried out by various different methods and in various different vessels. For example, in order of increasing abrasion, the agitation can be carried out in a fluid bed, a bubbling or ebullient bed, a spouting bed, or a conveyor. In one embodiment, agitation is carried out by fluid conveyance, including without limitation by gas flow or pneumatic conveyance. In one embodiment, agitation is carried out in a riser or a downer.

Agitating solid biomass particles, to reduce a size characterizing at least a portion of the particles, can result in a dispersion of particle sizes. For example, proper agitation the solid biomass particles as described above can result in individual particles sizes ranging from microns, to tens of microns, to tenths of centimeters, to centimeters or greater. In various embodiments, at least a fraction of the biomass particles are reduced to a size below about 100, 90, 80, 70, 60, 50, 45, 40, 35, 30, 25, 20, or 15 microns.

In general, at least a fraction of the biomass particles are reduced to a size between about 1 mm and 1 micron. For example, the biomass particles can have an average size of about 300-500 microns comprised of mainly individual sizes of about 10-1,000 microns.

In various embodiments, the plurality of solid biomass particles are substantially characterized by an average size between about 50 and about 70 microns and individual sizes between about 5 and about 250 microns. In other embodiments, the plurality of solid biomass particles are substantially characterized by an average size between about 10 and about 20 microns and individual sizes between about 5 and about 50 microns. In other embodiments, the plurality of solid biomass particles are substantially characterized by an average size between about 100 and about 150 microns and individual sizes between about 5 and about 500 microns.

International Publication No. WO 20071128798 A1 by O'Connor, the disclosure of which is incorporated herein by reference in its entirety, discloses agitating solid biomass particles and catalysts. In particular, paragraphs [0027] to [0072] of WO 20071128798 A1 are incorporated herein by reference.

International Publication No. WO 2008/009643 A2 by O'Connor, the disclosure of which is incorporated herein by reference in its entirety, discloses agitating solid biomass particles and catalysts. In particular, paragraphs [0009] to [0051] of WO 2008/009643 A2 A1 are incorporated herein by reference.

Separation of Biomass Particles

In various embodiments, methods include separating a biomass-catalyst mixture into a fine fraction and a coarse fraction. The biomass-catalyst mixture includes the biomass particles and a catalyst. The fine fraction includes particles of about a predetermined size. The coarse fraction includes particles of greater than about the predetermined size. Separating the mixture into a fine fraction and a coarse fraction can have several effects. For example, a fine fraction can be selected to include particles of about a predetermined size, below about a predetermined size, and/or within a predetermined size range. In some embodiments, the fine fraction can be selected to consist essentially of particles of about a predetermined size, below about a predetermined size, and/or within a predetermined size range. Furthermore, a coarse fraction can be recycled for further size reduction and/or to produce more of a fine fraction.

A predetermined size can be selected based upon one or more requirements of a subsequent reaction. For example, a predetermined size can be selected to facilitate substantial catalytic conversion of the fine fraction in a subsequent reaction. A predetermined size can be selected to facilitate contact, impregnation, and/or interaction of the catalyst and the biomass. In some embodiments, a predetermined size can be about 1,000, 900, 800, 700, 600, 500, 450, 400, 350, 300, 250, 200, 150, 100, 50, 45, 40, 35, 30, 25, 20, 15, 10, or 5 microns. In one embodiment, a predetermined size is about 15 microns. In one embodiment, a predetermined size is about 10 microns. A predetermined size can be between about 5 and about 1000 microns.

Separating can be facilitated by a cyclonic action. A separator can include a single cyclone. Alternatively, a separator can include a plurality of cyclones arranged, for example, in parallel, series, as a third stage separator, or as a fourth stage separator. U.S. Pat. No. 6,971,594 to Polifka, the disclosure of which is incorporated herein by reference in its entirety, discloses cyclonic action and cyclone separators that can be adapted and employed with the invention. In particular, FIG. 2, the text corresponding to FIG. 2, and the text corresponding to column 4, line 55 to column 11, line 55 of U.S. Pat. No. 6,971,594 are incorporated herein by reference.

Separating can be achieved by other known methods. For example, separating can be achieved by screening, settling, clarification, and the like.

Catalysts and Inorganic Particulate Materials

A catalyst can be any material that facilitates the conversion of organic components of the biomass into fuels, specialty chemicals, or precursors thereof. In various embodiments, the catalyst includes a solid particulate catalyst and the biomass-catalyst mixture includes at least a portion of the catalyst mechano-chemically interacting with at least a portion of the solid biomass particles. In some embodiments, the catalyst includes a catalyst capable of being at least partly dissolved or suspended in a liquid and the biomass-catalyst mixture includes at least a portion of the catalyst impregnating at least a portion of the solid biomass particles.

In various embodiments, a catalyst is a particulate inorganic oxide. The particulate inorganic oxide can be a refractory oxide, clay, hydrotalcite, crystalline aluminosilicate, layered hydroxyl salt, or a mixture thereof. Suitable refractory inorganic oxides include alumina, silica, silica-alumina, titania, zirconia, and the like. In one embodiment, the refractory inorganic oxides have a high specific surface (e.g., a specific surface area as determined by the Brunauer Emmett Teller ("BET") method of at least 50 m2/g). Suitable clay materials include cationic and anionic clays, for example, smectite, bentonite, sepiolite, atapulgite, hydrotalcite, and the like. Suitable metal hydroxides and metal oxides include bauxite, gibbsite and their transition forms. Other suitable (and inexpensive) catalysts include lime, brine, and/or bauxite dissolved in a base (e.g., NaOH), or a natural clay dissolved in an acid or a base, or fine powder cement (e.g., from a kiln). Suitable hydrotalcites include hydrotalcite, mixed metal oxides and hydroxides having a hydrotalcite-like structure, and metal hydroxyl salts.

In some embodiments, a catalyst can be a catalytic metal. The catalytic metal can be used alone or together with another catalyst. A catalytic metal can be used in a metallic, oxide, hydroxide, hydroxyl oxide, or salt form, or as a metallo-organic compound, or as a material including a rare earth metal (e.g., bastnesite). In certain embodiments, the catalytic metal is a transition metal. The catalytic metal can be a non-noble transition metal. For example, the catalytic metal can be iron, zinc, copper, nickel, and manganese. In one embodiment, the catalytic metal is iron.

A catalytic metal can be contacted with the biomass by various methods. In one embodiment, the catalyst is added in its metallic form, in the form of small particles. Alternatively, the catalyst can be added in the form of an oxide, hydroxide, or a salt. In another embodiment, a water-soluble salt of the metal is mixed with the biomass and the inert particulate inorganic material to form an aqueous slurry. The biomass and the aqueous solution of the metal salt can be mixed before adding the inert particulate inorganic material to facilitate the metal's impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulate biomass, and the inert inorganic material is thus converted to a heterogeneous catalyst.

The biomass-catalyst mixture can include an inorganic particulate material. An inorganic particulate material can be inert or catalytic. An inorganic material can be present in a crystalline or quasi-crystalline form. Exemplary inert materials include inorganic salts such as the salts of alkali and alkaline earth metals. Although these materials do not necessarily contribute to a subsequent chemical conversion of the polymeric material, it is believed that the formation of discrete particles of these materials within the biomass can work as a wedge to mechanically break up or open the structure of the biomass, which can increase the biomass surface accessible to microorganisms and/or catalysts. In one embodiment, the breaking up or opening is facilitated by crystalline or quasi-crystalline particles.

Inorganic particulate material can have catalytic properties. For example, a catalytic inorganic particulate material can be a metal oxide or hydroxide such as an alumina, silica, silica aluminas, clay, zeolite, ionic clay, cationic layered material, layered double hydroxide, smectite, saponite, sepiolite, metal hydroxyl salt, and the like. Carbonates and hydroxides of alkali metals, and the oxides, hydroxides and carbonates of alkaline earth metals can also have catalytic properties. Inorganic particulate material can include mixtures of inorganic materials. Inorganic particulate material can include a spent (resid) fluid catalytic cracking catalyst containing (thermally treated) layered material. Employing spent catalyst can involve reusing waste material. The spent catalyst can be ground of pulverized into smaller particles to increase its dispersibility. Inorganic particulate material can also include sandblasting grit. Employing sandblasting grit can involve reusing waste material, which can include particles of iron, and lesser quantities of other suitable metals such as nickel, zinc, chromium, manganese, and the like (e.g., grit from steel sandblasting).

Contacting the catalyst, and optionally the inorganic particulate material, with the biomass, can be achieved by various methods. One method includes heating and fluidizing a mixture of the particulate biomass material and the inert inorganic material, and adding the catalyst to the mixture as fine solid particles. Another method includes dispersing the catalytic material in a solvent (e.g., water), and adding the solvent to the mixture of particulate biomass material and the inert inorganic material.

European Patent Application No. EP 1 852466 A1 by O'Connor, the disclosure of which is incorporated herein by reference in its entirety, discloses catalysts and contacting catalysts and biomass. In particular, paragraphs [0011] to [0043] of EP 1 852466 A1 are incorporated herein by reference.

International Publication No. WO 20071128799 A1 by O'Connor, the disclosure of which is incorporated herein by reference in its entirety, discloses catalysts and contacting catalysts and biomass. In particular, paragraphs [0015] to [0054] of WO 20071128799 A1 are incorporated herein by reference.

Removing Metals and/or Minerals

In various embodiments, a pretreatment can reduce an ash content of biomass, or a hazardous disposal characteristic of an ash that may be subsequently produced. Removal of minerals (e.g., ash precursors) from the biomass can reduce the ash content. Removal of metals (e.g., ash precursors), particularly heavy metals, can also reduce ash content and prevent metal contamination of waste products, thereby facilitating disposal of waste by providing an uncontaminated waste product and reducing the cost of disposing of the waste product.

A pretreatment for reducing ash content can include swelling the biomass with a solvent and then removing solvent from the swollen biomass material by applying mechanical action to the biomass material. Ash precursors, such as dissolved minerals and/or metals, will thus be removed with the solvent. The solvent can be aqueous. The solvent can include an acid or base (e.g., inorganic acid or base). The mechanical action can occur in an agitator and/or a kneader. The mechanical action can be exerted by equipment such as a high shear mixer, kneader, colloid mill, planetary mixer, mix-miller, or ball mill. A pretreatment for reducing ash content can include washing or slurrying with an aqueous phase having pH above or below neutral, ion exchange (e.g., with ammonium solutions that would exchange a hydrogen ion with a metal ion), and steam stripping are possible methods.

Pretreatment can reduce ash content to less than about 10 wt %, 9 wt %, 8 wt %, 7 wt %, 6 wt %, 5 wt %, 4 wt %, 3 wt %, 2 wt %, or 1 wt %, based on dry weight of the biomass material. The pretreatment can reduce metal (e.g., Fe) content to less than about 3,000, 2,500, 2,000, 1,500, 1,000, or 500 mg/kg, based on dry weight of the biomass.

Kneaders

A kneader can be used to knead the solid biomass particles and the catalyst, to make at least a portion of the solid biomass particles accessible to at least a portion of the catalyst. The kneader can be an extruder, miller, mixer, or grinder. The kneader can operate at greater than ambient temperature, for example, to facilitate removal or water and/or other solvent. For example, the kneader can be heated and/or heated gas (e.g., steam) can be provided to heat the biomass and catalyst.

In various embodiments, the kneader employs a solvent. The solvent can be water, an alcohol (e.g., ethanol or glycerol), a bio-oil or another product from the conversion of the biomass, a liquid acid, an aqueous solution of an acid or base, liquid CO2, and the like. In one embodiment, the solvent is water (e.g., added water and/or water inherently present in the biomass), which can be selected for its availability, low cost, and/or ease of handling. In another embodiment, the solvent is a liquid produced during the subsequent conversion of the biomass, which can be selected for its availability. A solvent can be selected to improve penetration of a catalyst into biomass. A solvent can also improve penetration of a catalyst into biomass because a dry biomass can be more difficult to penetrate. A solvent can also be selected to remove ash precursors. Solvents can be removed (e.g., by drying) prior to subsequent processing and/or conversion. A kneader can remove at least a portion of a solvent absorbed in a biomass (e.g., by mechanical action and draining). Embodiments employing a kneader and a solvent can reduce the ash and/or mineral and/or metal content of the biomass.

In various embodiments, the biomass can be kneaded with one or more solid catalyst and/or inorganic particulate material. In some embodiments, the biomass can be kneaded with a dissolved and/or suspended catalyst. The dissolved and/or suspended catalyst can be used together with one or more solid catalyst and/or inorganic particulate material. Kneading can be continued and/or repeated to produce a biomass-catalyst mixture having the desired properties (e.g., particle size and/or degree of sensitization).

International Publication No. WO 20071128800 A1 by O'Connor, the disclosure of which is incorporated herein by reference in its entirety, discloses catalysts and sensitizing biomass, as well as sensitizing by kneading. In particular, paragraphs [0025] to [0074] with respect to catalysts and sensitizing biomass, as well paragraphs [0076] to [0086] with respect to sensitizing by kneading, of WO 20071128800 A1 are incorporated herein by reference.

Disintegrators

The disintegrator processes plant matter at a location in close proximity to an agricultural site used to produce such plant matter, to produce the solid biomass particles. In operation, a disintegrator can be used to modify the consistency of, e.g., biomass feedstock, and/or to reduce its average particle size. The disintegrator can include at least one of a mill, fragmenter, fractionator, granulator, pulverizer, chipper, chopper, grinder, shredder, mincer, and a crusher. Apparatuses including a disintegrator can process plant matter at a location in close proximity to an agricultural site used to produce such plant matter, to produce the solid biomass particles. U.S. Pat. No. 6,485,774 to Bransby, the disclosure of which is incorporated herein by reference in its entirety, discloses a method of preparing and handling chopped plant materials. In particular, the text corresponding to column 1, line 45 to column 4, line 65 of U.S. Pat. No. 6,485,774 is incorporated herein by reference.

EXAMPLES

FIGS. 1-10 illustrate exemplary modular biomass treatment units for preparing and processing biomass with catalyst, as well as methods corresponding to the operation of modular biomass treatment units. It should be understood that one skilled in the art can modify or adapt the exemplary modular biomass treatment units, or any other unit described herein, to convert biomass into fuels or specialty chemicals. For example, catalyst, reaction vessel(s), pretreatment, and reaction conditions can be selected based upon the type of biomass and the desired product(s). In some embodiments, the processing can occur in a single unit, module, or vessel. In other embodiments, two, three, or more vessels can be used.

In various embodiments, the intermediates include hydrocarbons from which oxygen is stripped (e.g., as CO, C02, H20) to produce traditional fuel or specialty chemical products such as light gases, naphtha, heating oils, jet fuel, and the like. In general, processing proceeds by cracking and deoxygenating (as necessary) polymeric compounds in the biomass into a fuel or specialty chemical product. In various embodiments, intermediates can be stripped quickly from the catalysts and unconverted biomass to limit secondary (e.g., undesired) reactions.

FIGS. 1-5 show exemplary modular biomass treatment units.

FIG. 1 shows an exemplary first module 100, including a pretreater 105 and a first frame 115, for transportation to and operation at a site adjacent to a solid biomass growth source. The pretreater 105 processes solid biomass to produce a plurality of solid biomass particles for conversion into a fuel or specialty chemical. The first frame 115 supports the pretreater 105 during transportation to and operation at the site adjacent to the solid biomass growth source.

The pretreater 105 can include any one or more of the disintegrators, kneaders, agitators, separators, riser, downer, conveyor, mixers, cyclones, extruders, ion-exchangers, pretreaters, and the like for removing metals and/or minerals, agitating the solid biomass particles, reducing particle size, and/or separating the solid biomass particles. In one example, the pretreater 105 includes a contactor for forming a mechano-chemical interaction between at least a portion of the solid biomass particles and a catalyst and/or impregnating at least a portion of the solid biomass particles with a catalyst. The pretreater 105 can include a demineralizer adapted for removing minerals from the solid biomass and/or a dryer adapted for dewatering and torrifying the solid biomass. Depending on the vessel/methods employed, chemical supplies and holding vessels, air compressors, and/or knock out drums and/or separation vessels can be included. The pretreater 105 can include a hopper for biomass feed and/or a hopper for catalyst feed.

The pretreater 105 can include, for example, one or more cyclonic vessels. The cyclonic vessels can be operated at high velocity (e.g., near sonic velocity). Spent air from the cyclonic vessels can be routed to a regenerator to burn coke on catalyst (e.g., with entrained water vapor from drying or after the water is separated from the air). Biomass treated in such a pretreater can have a relatively small size (e.g., about 80% less than about 10 microns).

The pretreater 105 can include a solvent/moisture extractor for drying biomass (e.g., to less than about 20%, 15%, 10%, 5% moisture). Minerals can be removed from the biomass during pre-processing and a resulting water/mineral mix can be used immediately or can go to a storage vessel for later use as fertilizer (e.g., P, N, C containing material). The pretreater 105 can also include a heater treater for roasting or toasting biomass. A first module 100 can use recovered heat (e.g., from a regenerator, for example through an ATA heat exchanger, or by sending hot flue gas directly into a pre-processing vessel). A first module 100 can use heat from combustion of a waste or product (e.g., bio-oil) from biomass treatment.

One advantage to the first frame 115 supporting the pretreater 105 is rapid preparation for operation at the site adjacent to the solid biomass growth source, which minimizes the need for specialized equipment and/or specialized workers. However, the invention also includes examples where the first frame 115 is removed, refitted, replaced, or otherwise modified prior to operation at the site adjacent to the solid biomass growth source.

The first module 100 can be part of a solid biomass harvester. In general, the first module 100 can be towed, driven, mounted, pushed, parked, or otherwise moved or placed by industrial or agricultural equipment (e.g., cranes to rail cars, ships to truck, in containers). For example, the first module 100 can be part of a harvester vehicle used to harvest solid biomass. Such an can reduce transportation costs and time by reducing the size (e.g., by disintegrating) and weight (e.g., by drying) and by delivering a refined product directly to a subsequent module for subsequent processing.

Optionally, the first module 100 can include skids and is sized to be or fit within one or more shipping containers (e.g., containers for air, water, rail, road, or off-road transportation). Skids can include essentially any material and/or arrangement used in connection with conventional shipping containers. In one example, the first module 100 fits within a single container. In another example, the first module 100 fits within multiple containers (e.g., in pieces, parts, or sections). The invention also contemplates arrangements of multiple modules within a single container. In general, parts of modules can be shipped separately and assembled later (e.g., flanged, bolted, welded, and/or snapped together after shipping, at the site). A module or part can be transported horizontally (e.g., where it is too tall to fit in a container in its operational orientation) and repositioned at the site (e.g., by hydraulic lift, crane). Skids can also be designed to facilitate the stacking of multiple units.

Figure 2:
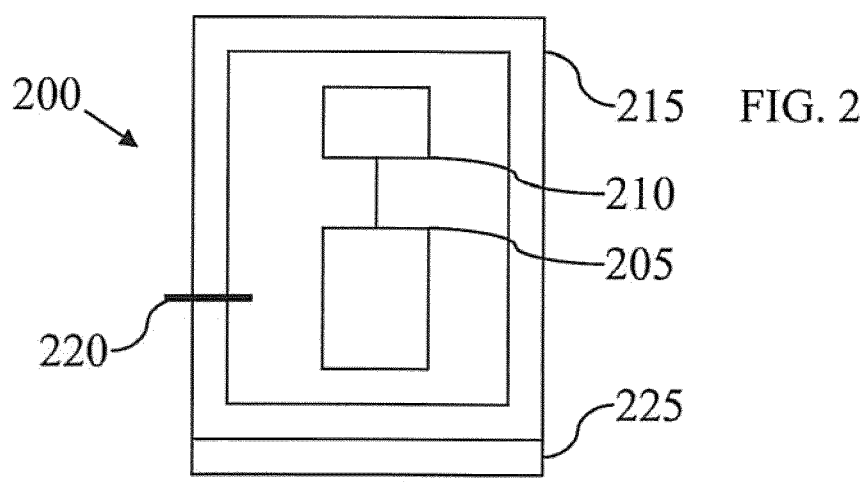
FIG. 2 illustrates a sectional view of an exemplary second module, including a reactor, a separator, and a second frame for transportation to and operation at the site adjacent to the solid biomass growth source.

FIG. 2 shows an exemplary second module 200, including a reactor 205, a separator 210, and a second frame 215 for transportation to and operation at the site adjacent to the solid biomass growth source. In general, the second module 200 is associated with a first module 100, to form a modular biomass treatment unit. The association can be spatially proximal (e.g., the first module 100 feeds the second module 200 directly or through a local connection) or spatially distal (e.g., the first module 100 feeds the second module 200 indirectly or through a non-local connection, such as shipping or piping).

The reactor 205 deoxygenates the plurality of solid biomass particles, to produce a liquefied product. In various embodiments, deoxygenating includes reducing an oxygen content of the biomass-catalyst mixture through chemical conversion. Oxygen reduction does not need to be complete, although it can be essentially complete (e.g., approximately 100% removal) in some embodiments. In one embodiment, the deoxygenated product includes less than about 10 wt % oxygen. In various embodiments, the deoxygenated product can include about 0-5, 5-10, 10-15, 15-20, or 20-25 wt % oxygen. In one embodiment, deoxygenating the biomass-catalyst mixture includes removing at least about 90 wt % oxygen from the biomass. In various embodiments, deoxygenating the biomass-catalyst mixture includes removing about 75-80, 80-85, 85-90, 90-95, or 95-100 wt % oxygen from the biomass. The deoxygenated product can include products, intermediates, or both. The deoxygenated product can include a vapor phase at temperature below about 400° C. (i.e., the deoxygenating and cracking temperature). The deoxygenated product can include a liquid phase at temperature below about 20° C. (i.e., room temperature).

The separator 210 separates a biocrude for conversion into a fuel or specialty chemical from the liquefied product. However, the separator 210 is optional and can be excluded (e.g., not part of the second module 200, in which case a separator can be part of another unit or module). A separator can be a phase separator to separate an organic phase from an aqueous and/or gaseous phase (e.g., flash drum, knock out drum). Where a separator separates an organic phase, the organic phase can be transported to another location for one or more of further separation, refining, conversion, or use. A separator can be a fractionator (e.g., tower) to separate a fraction of a liquid product for a specific use (e.g., desired fuel). In general, a separator can include one or more organic phase separators and fractionators. A separator can also be set up for block operation.

In general, a second module 200 can include anyone or more of a: riser, fixed bed fluidized reactor, a cyclonic reaction vessel, a regenerator (e.g., for burning coke deposited on FCC type catalyst), cyclone, stripper (e.g., vessel for removal of hydrocarbons and catalyst separation prior to regeneration), catalyst recycling system (e.g., for recycling the regenerated catalyst back to the reactor and/or riser), fresh catalyst hopper/addition vessel, vessel for handling spent catalyst and/or flue gas clean up, disposal vessel, and the like. A second module 200 can include a system for product recovery, separation of one or more of water, ash, pretreatment minerals, and char. Separated element can be used for fertilizer or returned to the environment.

The second frame 215 supports the reactor and separator during transportation to and operation at the site adjacent to the solid biomass growth source. As with the first frame 115, one advantage to the second frame 215 supporting the reactor 205 and the separator 210 is rapid preparation for operation at the site adjacent to the solid biomass growth source, which minimizes the need for specialized equipment and/or specialized workers. However, the invention also includes examples where the second frame 215 is removed, refitted, replaced, or otherwise modified prior to operation at the site adjacent to the solid biomass growth source.

Optionally, the second module 200 can include a coupling mechanism 220 for detachably engaging one or more first modules. In one example, the coupling mechanism 220 can be a local connection (e.g., pipe, hose, tube, or other conduit, flange, bolt, weld, and/or snap and the like) for engaging a proximal first module. In another example, the coupling mechanism 220 can be a non-local connection (e.g., conduit receiving shipped- or piped-in biomass) for engaging a distal first module. A coupling mechanism can include one or more snap-op utility hookup.

Optionally, the second module 200 can include skids and is sized to fit within one or more shipping containers (e.g., containers for air, water, rail, road, or off-road transportation). Alternatively, the second module 200 can be in the form of a shipping container. Skids can include essentially any material and/or arrangement used in connection with conventional shipping containers. In one example, the second module 200 fits within a single container. In another example, the second module 200 fits within multiple containers (e.g., in pieces, parts, or sections). The invention also contemplates arrangements of multiple modules within a single container.

In one embodiment, the second module 200 can include lines for heat transfer, to achieve an increasing temperature profile within a reactor, and/or a stripper with a hot catalyst inlet, to increase stripping temp. Such modification can increase processing efficiency and can mitigate or eliminate the need for additional reactor cycles or reactors (e.g., a third module).

Figure 3:
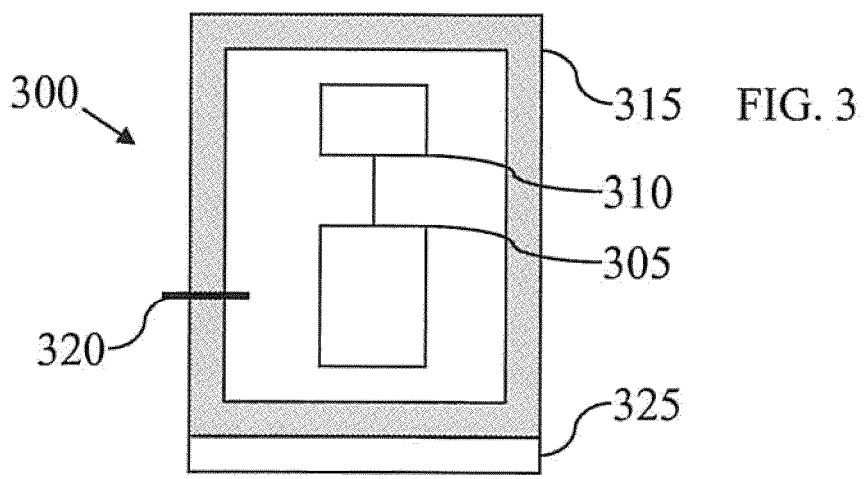
FIG. 3 illustrates a sectional view of an exemplary third module, including a second reactor, a second separator, and a third frame for transportation to and operation at the site adjacent to the solid biomass growth source.

FIG. 3 shows an exemplary third module 300, including a second reactor 305, a second separator 310, and a third frame 315 for transportation to and operation at the site adjacent to the solid biomass growth source. In general, the third module 300 is associated with a second module 200 and a first module 100, to form a modular biomass treatment unit. The association can be spatially proximal (e.g., the second module 200 feeds the third module 300 directly or through a local connection) or spatially distal (e.g., the second module 200 feeds the third module 300 indirectly or through a non-local connection, such as shipping or piping).

The second reactor 305 refines the biocrude to produce a refined product, deoxygenates remaining solid biomass to produce additional liquefied product, or both refines the biocrude and deoxygenates remaining solid biomass.

The second separator 310 separates a fuel or specialty chemical from the refined product, separates a biocrude for conversion into a fuel or specialty chemical from the liquefied product, or both separates a fuel or specialty chemical and separates a biocrude. However, the second separator 310 is optional and can be excluded (e.g., not part of the third module 300, in which case a separator can be part of another unit or module). A separator can be a phase separator to separate an organic phase from an aqueous and/or gaseous phase (e.g., flash drum, knock out drum). Where a separator separates an organic phase, the organic phase can be transported to another location for one or more of further separation, refining, conversion, or use. A separator can be a fractionator (e.g., tower) to separate a fraction of a liquid product for a specific use (e.g., desired fuel). In general, a separator can include one or more organic phase separators and fractionators. A separator can also be set up for block operation.

In general, a third module 300 can include anyone or more of a: riser, fluidized bed reactor, cyclone, stripper, hot catalyst inlet line (e.g., to increase the reactor temperature), water separator, and product recovery vessel. In some embodiments, a third module 300 can be an additional second module 200 and can accordingly include any of the elements or combination described in connection with the second module 200.

The third frame 315 supports the second reactor and the second separator during transportation to and operation at the site adjacent to the solid biomass growth source. As with the first frame 115 and the second frame 215, one advantage to the third frame 315 supporting the second reactor 305 and the second separator 310 for rapid preparation for operation at the site adjacent to the solid biomass growth source, which minimizes the need for specialized equipment and/or specialized workers. However, the invention also includes examples where the third frame 315 is removed, refitted, replaced, or otherwise modified prior to operation at the site adjacent to the solid biomass growth source.

Optionally, the third module 300 can include a coupling mechanism 320 for detachably engaging one or more second modules. In one example, the coupling mechanism 320 can be a local connection (e.g., pipe, hose, tube, or other conduit, flange, bolt, weld, and/or snap and the like) for engaging a proximal second module. In another example, the coupling mechanism 320 can be a non-local connection (e.g., conduit receiving shipped- or piped-in biomass) for engaging a distal second module. A coupling mechanism can include one or more snap-op utility hookups.

Optionally, the third module 300 can include skids and is sized to fit within one or more shipping containers (e.g., containers for air, water, rail, road, or off-road transportation). Alternatively, the third module 300 can be in the form of a shipping container. Skids can include essentially any material and/or arrangement used in connection with conventional shipping containers. In one example, the third module 300 fits within a single container. In another example, the third module 300 fits within multiple containers (e.g., in pieces, parts, or sections). The invention also contemplates arrangements of multiple modules within a single container.

Figure 4:
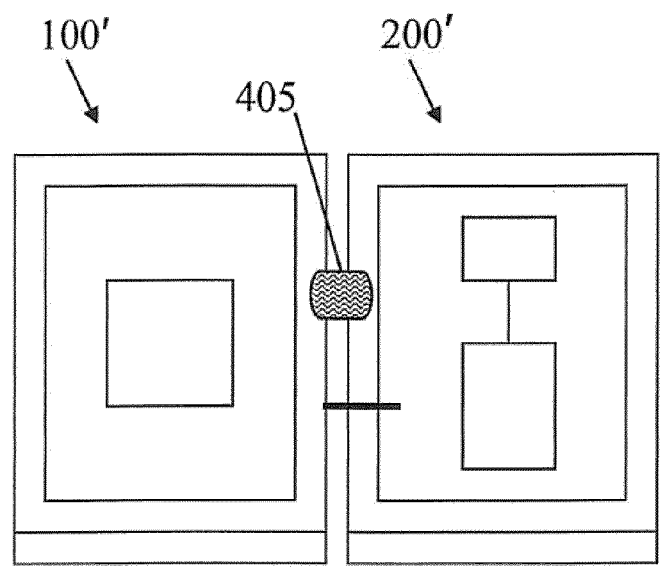
FIG. 4 illustrates a sectional view of an exemplary unit comprising a first module and a second module, which are connected by a coupling mechanism.
Figure 5:
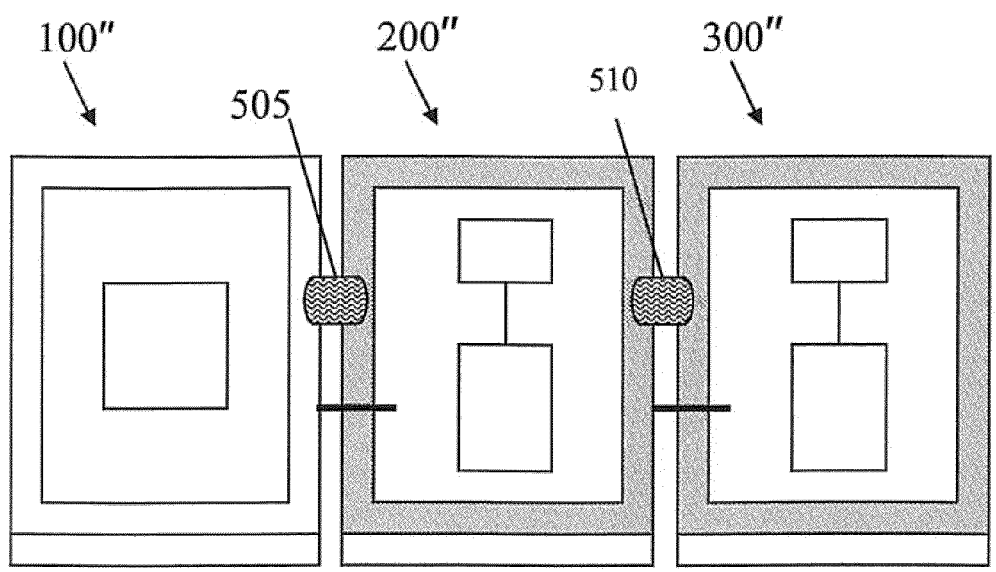
FIG. 5 illustrates a sectional view of an exemplary unit comprising a first module, a second module, and a third module, which are connected by coupling mechanisms.

FIG. 4 illustrates an exemplary unit 400 comprising a first module 100' and a second module 200', which are connected by a coupling mechanism 405. FIG. 5 illustrates an exemplary unit 500 comprising a first module 100", a second module 200", and a third module 300", which are connected by coupling mechanisms 505, 510. In various embodiments, the first modules 100', 100", second modules 200',200", and third module 300" can include any of the features described above and in connection with FIGS. 1-3. Units can also include essentially any combination of modules and can be designed for various situations (e.g., two or more first units in combination with one second unit where pre-processing is de-centralized and processing is centralized, etc.). Although these two exemplary units are illustrated with the modules immediately adjacent each other, the invention also contemplates arrangements where the modules are not immediately adjacent one another (e.g., non-local connection). Modules can also be in essentially direct contact.

In various embodiments, anyone or more of the units and modules can integrated with containerization (e.g., be sized to fit within a shipping container, or be in the form of a shipping container). Containerization is a system of intermodal cargo transport using standard. ISO containers (also known as isotainers) that can be loaded on container ships, railroad cars, and trucks. There are five common standard lengths, 20 ft (6.1 m), 40 ft (12.2 m), 45 ft (13.7 m), 48 ft (14.6 m) and 53 ft (16.2 m). US domestic standard containers are generally 48 ft and 53 ft. Container capacity (of ships, ports, etc) is measured in twenty-foot equivalent units (TEU, or sometimes teu). A twenty-foot equivalent unit is a measure of containerized cargo equal to one standard 20 ft (length)×8 ft (width)×8.5 ft (height) container. In metric units this is 6.10 m (length)×2.44 m (width)×2.59 m (height), or approximately 39 m3. Most containers today are of the 40-ft variety and thus are 2 TEU. 45 ft containers are also designated 2 TEU. Two TEU are referred to as one forty-foot equivalent unit (FEU). These two terms of measurement are used interchangeably. "High cube" containers have a height of 9.5 ft (2.9 m), while half-height containers, used for heavy loads, have a height of 4.25 ft (1.3 m).

Any of the units and/or modules can be adapted to facilitate unloading and/or setup on a pre-designed and/or pre-set foundation. Methods can include preparing a site for one or more of the units and/or modules, for example, by setting up a foundation and/or utilities. Utilities can be centralized and/or placed in an area suitable for ready acceptance of utilities available at the site. Utilities can include electrical power connections, steam and condensate connections, instrument and process gasses (e.g., air, nitrogen), water, transport (e.g., road, rail, water), waste disposal, purification and the like if specific utilities are not available, vessels or supplies (e.g., a steam production vessel) can be included in a unit or module. Modularity can facilitate set-up, break-down, transportation, and cleaning of processing equipment.

Any of the units and/or modules can include one or more tanks (e.g., portable, local) to buffer process flow. Tanks can store one or more intermediates and products.

The invention also includes methods of using the modules and units discussed described above and in connection with FIGS. 1-5. For example, methods can include receiving, setting up, and treating biomass one or more modules and units at one or more sited. Methods can include a setup at a single location (e.g., at a growth site for an extended period of time). Single location methods can be advantageous, for example, where there is a continuous source of biomass (e.g., centralized location at a farm or among farms). Methods can also be sequential (e.g., using one or more modules and units sequentially at a number of locations). Sequential methods can be advantageous, for example, where the harvest area is large and/or transporting the raw biomass is expensive (e.g., sequentially harvesting a large forest where the roads are poor). Methods can also be parallelized (e.g., using multiple pre-treaters to feed a centralized processing unit or refinery). Parallel methods can be advantageous, for example, where there are economies of scale in continuously feeding a large, centralized processing unit or refinery from multiple pre-processors.

Figure 6A:
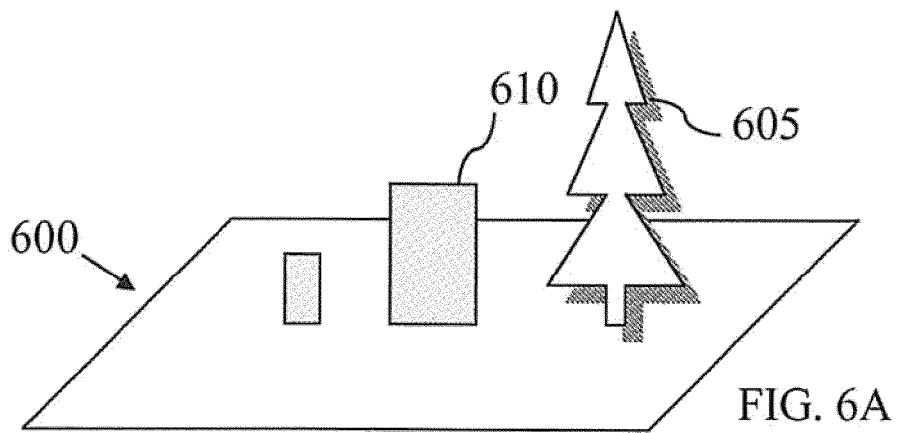
FIGS. 6A-6C illustrate an exemplary method for treating solid biomass at a site adjacent to a solid biomass growth source.
Figure 6B:
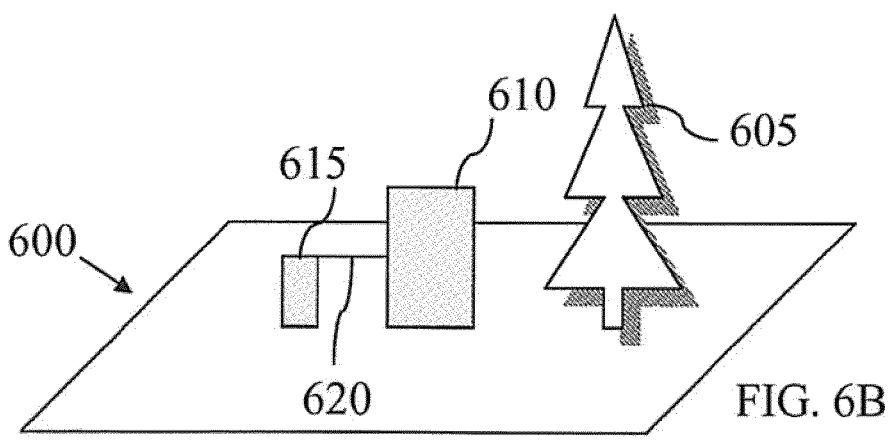
Figure 6C:
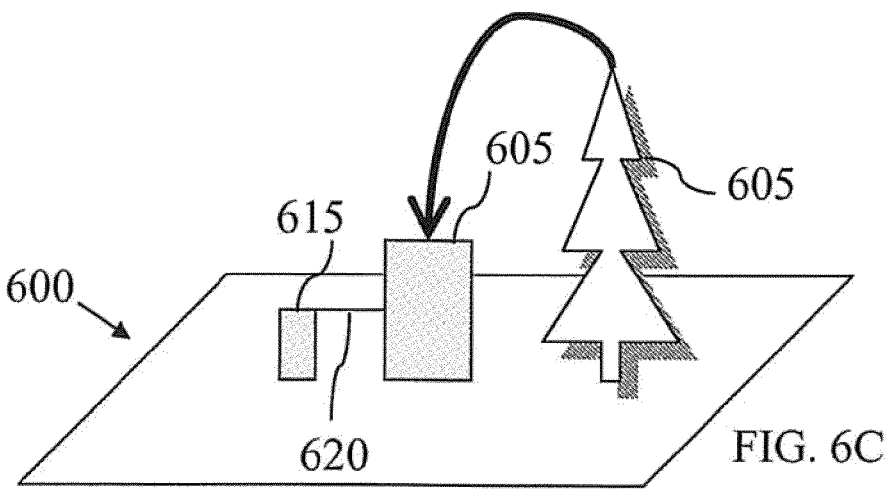

FIGS. 6A-6C illustrate an exemplary method for treating solid biomass at a site 600 adjacent to a solid biomass growth source 605. FIG. 6A illustrates the step of receiving a first module 610 comprising a pretreater supported by a first frame at a site 600 adjacent to a solid biomass growth source 605. FIG. 6B illustrates the step of connecting the first module 610 to utilities 615 (e.g., via a connector 620) at the site 600 adjacent to a solid biomass growth source 605. FIG. 6C illustrates the step of processing solid biomass from the solid biomass growth source 605 in the pretreater supported by the first frame, to produce a plurality of solid biomass particles for conversion into a fuel or specialty chemical. Although the solid biomass growth source 605 is illustrated diagrammatically as a tree, the term is used broadly and can include essentially any material of photosynthetic origin. The first module 610 can include any of the features described above and in connection with FIGS. 1-5.

The method illustrated in FIGS. 6A-6C can also include a second module (e.g., as described above and in connection with FIGS. 1-5). For example, a method can include receiving a second module having a reactor and a separator supported by a second frame at a second site, the second site adjacent to the solid biomass growth source or adjacent to a petroleum refinery. Next, the method can include the step of connecting the second module to utilities at the second site. Next, the method can include the step of deoxygenating the plurality of solid biomass particles in the reactor supported, by the second frame to produce a liquefied product. Next, the method can (optionally) include the step of separating a biocrude for conversion into a fuel or specialty chemical from the liquefied product in the separator supported by the second frame.

The method illustrated in FIGS. 6A-6C can also include a third module (e.g., as described above and in connection with FIGS. 1-5). For example, a method can include receiving a third module comprising a second reactor and a second separator supported by a third frame at the second site. Next, the method can include the step of connecting the third module to utilities at the second site. Next, the method can include the step of refining the biocrude in the second reactor supported by the third frame to produce a refined product, deoxygenating remaining solid biomass particles in the reactor supported by the second frame to produce additional liquefied product, or both refining the biocrude and deoxygenating remaining solid biomass particles. Next, the method can include the step of separating a fuel or specialty chemical from the refined product in the second separator supported by the third frame, separating a biocrude for conversion into a fuel or specialty chemical from the liquefied product in the separator supported by the second frame, or both separating a fuel or specialty chemical and separating a biocrude. As described above, any of the separators can be excluded from any one or more modules.

Figure 7A:
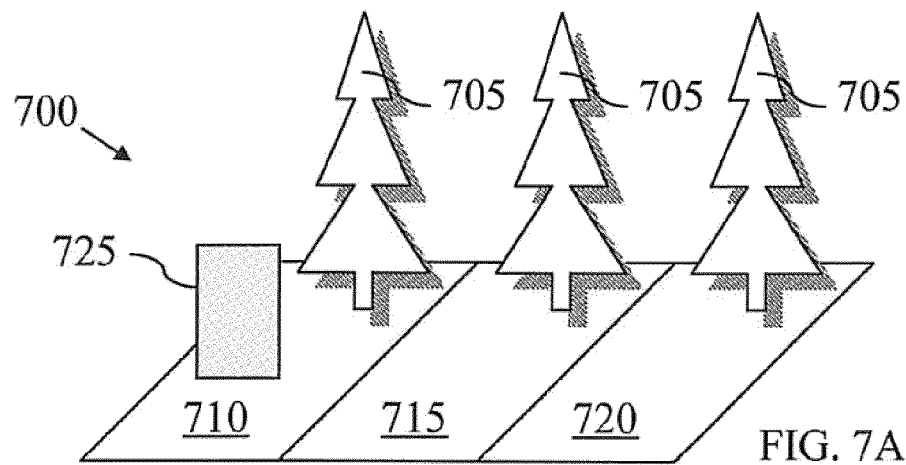
FIGS. 7A-7C illustrate methods for treating solid biomass from a solid biomass growth source on two or more sites.
Figure 7B:
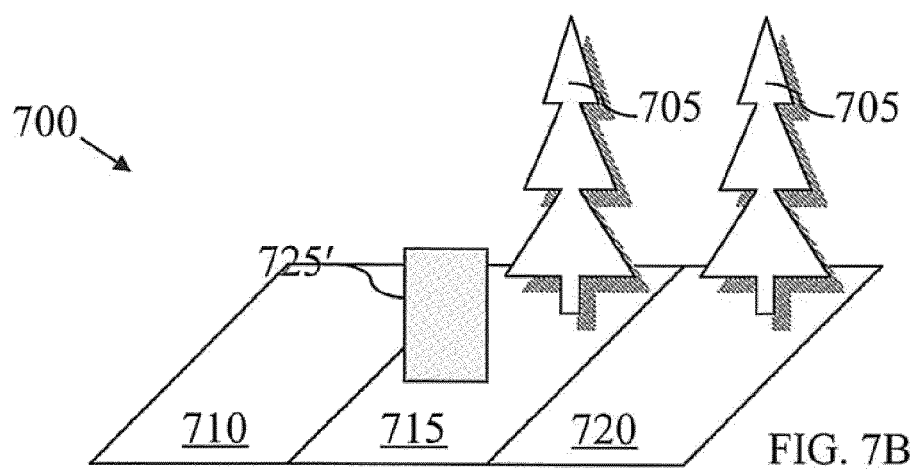

FIGS. 7A-7B illustrate a method 700 for treating solid biomass from a solid biomass growth source 705 on two or more sites, for example a first site 710 and a second site 715. FIG. 7A illustrates a first step of receiving a first module 725 having a pretreater supported by a first frame at a first site 710 adjacent to a first sector of a solid biomass growth source 705; connecting the first module 725 to utilities (not shown) at the first site 710; and processing solid biomass from the first sector in the pretreater to produce a first plurality of solid biomass particles for conversion into a fuel or specialty chemical. FIG. 7B illustrates a second step of receiving a first module 725' a second site 715 adjacent to a second sector of the solid biomass growth source 705; connecting the first module 725' to utilities at the second site 715; and processing solid biomass from the second sector in the pretreater to produce a second plurality of solid biomass particles for conversion into a fuel or specialty chemical.

The method of FIGS. 7A-7B can include a step of receiving a second module (not shown) comprising a reactor and a separator supported by a second frame at the first site 710; connecting the second module to utilities at the first site 710; deoxygenating the first plurality of solid biomass particles in the reactor, to produce a first liquefied product; and separating a first biocrude for conversion into a fuel or specialty chemical from the first liquefied product. Furthermore, the method of FIGS. 7A-7B can include a step of receiving the second module at the second site 715; connecting the second module to utilities at the second site 715; deoxygenating the second plurality of solid biomass particles in the reactor to produce a second liquefied product; and separating a second biocrude for conversion into a fuel or specialty chemical from the second liquefied product in the separator.

Figure 7C:
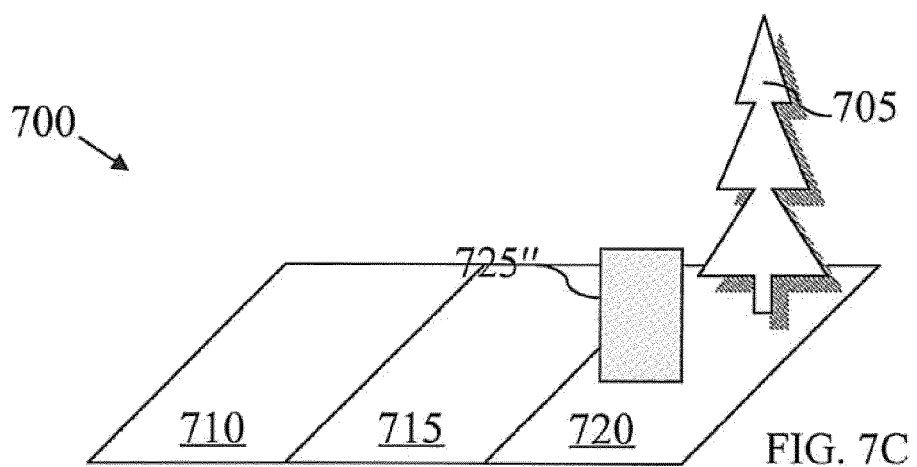

Furthermore, the method of FIGS. 7A-7B can include additional steps of receiving, connecting, and processing at additional sites (e.g., a third site 720 as illustrated in FIG. 7C) and/or processing with different modules and units (e.g., as described above and in connection with FIGS. 1-5). As described above, any of the separators can be excluded from anyone or more modules.

Another method includes treating solid biomass atone or more sites adjacent to a solid biomass growth source. First, the method includes receiving one or more first modules, each module comprising a pretreater supported by a frame, at one or more sites adjacent to a solid biomass growth source. Second, the method includes connecting the one or more first modules to utilities at the one or more sites adjacent to the solid biomass growth source. Third, the method includes processing solid biomass from the solid biomass growth source in the one or more pretreaters supported by first frames, to produce a plurality of solid biomass particles for conversion into a fuel or specialty chemical.

Figure 8:
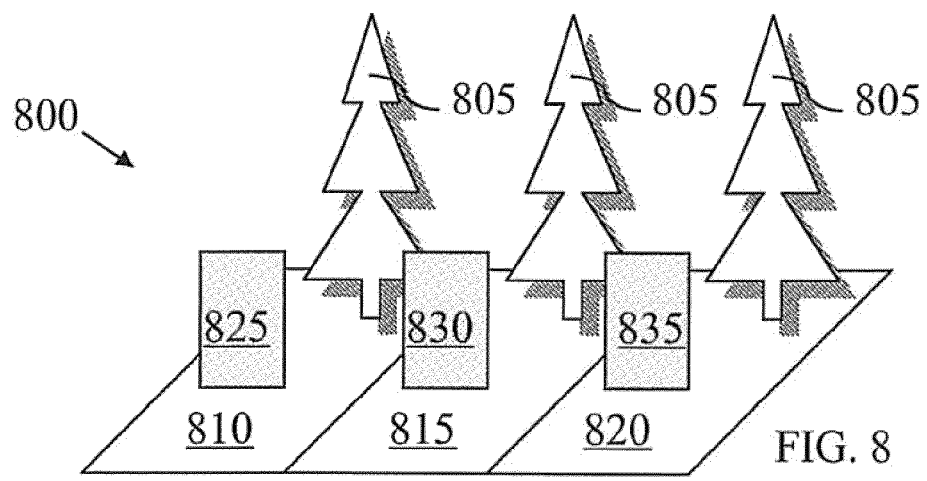
FIG. 8 illustrates a method for treating solid biomass at one or more sites adjacent to a solid biomass growth source.

FIG. 8 illustrates a method 800 for treating solid biomass at one or more sites adjacent to a solid biomass growth source 805. In FIG. 8, the one or more sites are illustrated as first 810, second 815, and third 820 sites adjacent to a solid biomass growth source 805. First, the method 800 included receiving first 825, second 830, and third 835 modules, each module comprising a pretreater supported by a frame, at first 810, second 815, and third 820 sites, respectively. Second, the method 800 includes connecting each modules to utilities at its respective site. Third, the method includes 800 processing solid biomass from the solid biomass growth source 805 in all of the pretreaters supported by first frames, to produce a plurality of solid biomass particles for conversion into a fuel or specialty chemical.

Figure 9:
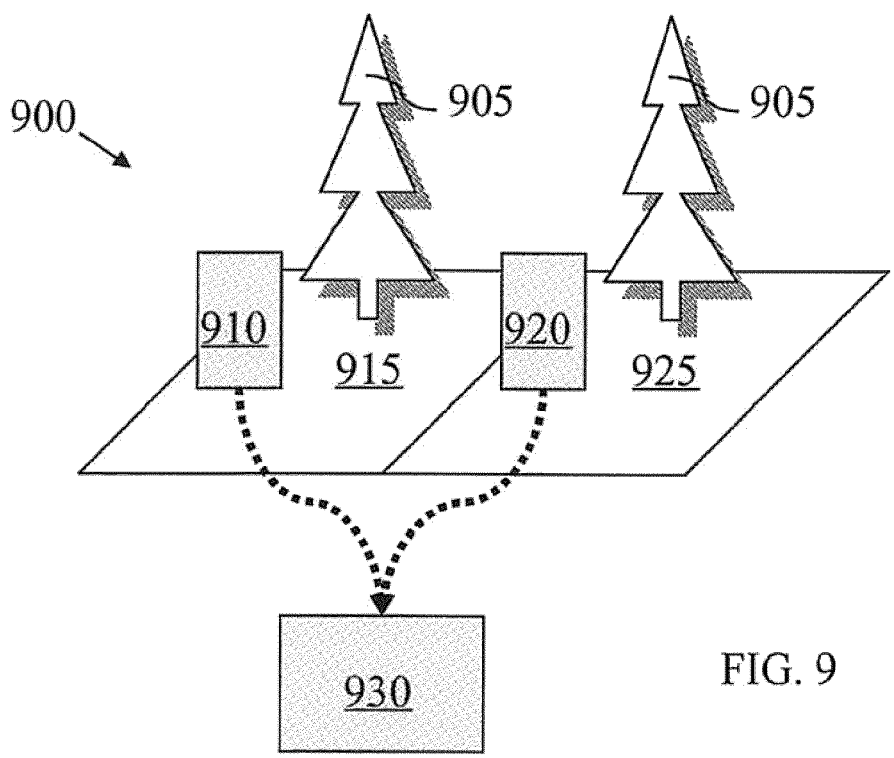
FIG. 9 illustrates a method for treating solid biomass from a solid biomass growth source.

FIG. 9 illustrates a method 900 for treating solid biomass from a solid biomass growth source 905. The method 900 includes receiving a first module 910 comprising a first pretreater supported by a first frame at a first site 915 adjacent to a first sector of the solid biomass growth source 905; connecting the first module to utilities (not shown) at the first site 915; and processing solid biomass from the first sector in the first pretreater, to produce a first plurality of solid biomass particles for conversion into a fuel or specialty chemical. The method 900 also includes receiving a second module 920 comprising a second pretreater supported by a second frame at a second site 925 adjacent to a second sector of the solid biomass growth source; connecting the second module 920 to utilities at the second site 925; and processing solid biomass from the second sector in the second pretreater, to produce a second plurality of solid biomass particles for conversion into a fuel or specialty chemical. Furthermore, the method 900 includes receiving the first and second plurality of solid biomass particles (illustrated by dashed arrows, which do not necessarily represent a physical connection) in a reactor 930, deoxygenating the plurality of solid biomass particles in the reactor 930 to produce a liquefied product, and separating a biocrude for conversion into a fuel or specialty chemical from the liquefied product.

Any of the methods disclosed herein can include a step of processing the plurality of solid biomass particles in a conventional petroleum refinery unit that has been adapted for processing solid biomass particles.

Similarly, any of the methods disclosed herein can include a step of co-processing the plurality of solid biomass particles and a conventional petroleum-based feedstock in a conventional petroleum refinery unit that has been adapted for co-processing solid biomass particles and a conventional petroleum-based feedstock.

One or more mobile units can be added or incorporated into existing agricultural harvesting and lumbering equipment. For example, a pre-processing unit can be integrated into a lumbering chipper, and when the lumber is processed, a fifty square mile radius could be covered with one of the satellite units described above. Since 8-15 year cycles are used between harvesting, the units could be sized from about 1000-2500 bpd biocrude production. These units can be moved as the desired areas are harvested, thus being able to cover hundreds or even thousands of square miles of forest land negating the need for a huge production facility or refinery located within or very near to the forests while minimizing feedstock transportation costs. Because a large percentage of forests (e.g., in the southeastern United States) are owned by relatively small area landowners, smaller satellite units can be ideally suited for the task of optimizing feedstock sources and growing/harvesting cycles. In similar fashion, these mobile units can exploit agricultural wastes left in the field after or during harvesting or completely utilize grown for fuel biomass.

Figure 10:
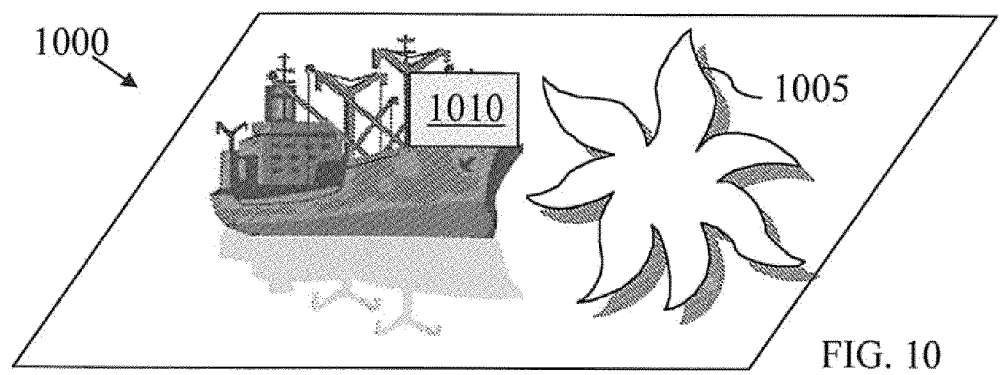
FIG. 10 illustrates an exemplary scenario for using a water-based biomass treatment unit.

FIG. 10 illustrates an exemplary scenario 1000 for using a water-based biomass treatment unit. The exemplary scenario 1000 includes an aquatic biomass source 1005 (e.g., algae, other aquatic biomass, and the like) and a treatment unit 1010 (e.g., a first module and a second module on a boat, barge, buoy, rig, platform, and the like) adjacent to the aquatic biomass source 1005.

A water-based biomass treatment unit including a first module and a second module can convert algae or other aquatic biomass into a biocrude at a site adjacent to an aquatic biomass source and. The first module has a pretreater and a first frame for transportation to and operation at a site adjacent to an aquatic biomass source. The pretreater is operable to process aquatic biomass to produce an aquatic biomass preparation for conversion into a biocrude. The first frame supports the pretreater during transportation to and operation at the site adjacent to the aquatic biomass source. The second module has a reactor, a separator, and a second frame for transportation to and operation at the site adjacent to the aquatic biomass source. The reactor is operable to deoxygenate the aquatic biomass preparation, to produce a liquefied product. The separator is operable to separate a biocrude for conversion into a fuel or specialty chemical from the liquefied produce. And, the second frame supports the reactor and separator during transportation to and operation at the site adjacent to the aquatic biomass source.

A water-based biomass treatment unit can include a converted aquatic vessel. For example, the water-based biomass treatment unit can operate on a taker vessel and, in operation, fill the tanks of the tanker vessel. Operating the treatment unit on a movable vessel can also have an advantage of positioning the vessel adjacent to new biomass sources (e.g., moving between algae/seaweed beds, along a river/lake harvesting biomass at different locations). The water-based biomass treatment unit can operate on an oil-rig type platform and, in operation, store or pump liquid product to another location.

Alternatively, a water-based biomass treatment unit can include a converted aquatic vessel, in which case the frame(s) of the unit can be excluded and the treatment unit set up for permanent or semi-permanent operation.

As always, pre-processing and/or processing modules can be selected for particular circumstances and/or purposes. For example, in a scenario 1000 for using a water-based biomass treatment unit, pre-treatment can include a system for separating triglycerides from the water-based biomass.

The water-based biomass treatment unit can also include a third module having a second reactor, a second separator, and a third frame for transportation to and operation at the site adjacent to the aquatic biomass. The second reactor is operable to refine the biocrude to produce a refined product, deoxygenate remaining aquatic biomass preparation to produce additional liquefied product, or both refine the biocrude and deoxygenate remaining aquatic biomass preparation. The second separator is operable to separate a fuel or specialty chemical from the refined product, separate a biocrude for conversion into a fuel or specialty chemical from the liquefied product, or both separate a fuel or specialty chemical and separate a biocrude. The third frame supports the second reactor and the second separator during transportation to and operation at the site adjacent to the aquatic biomass source.

Figure 11:
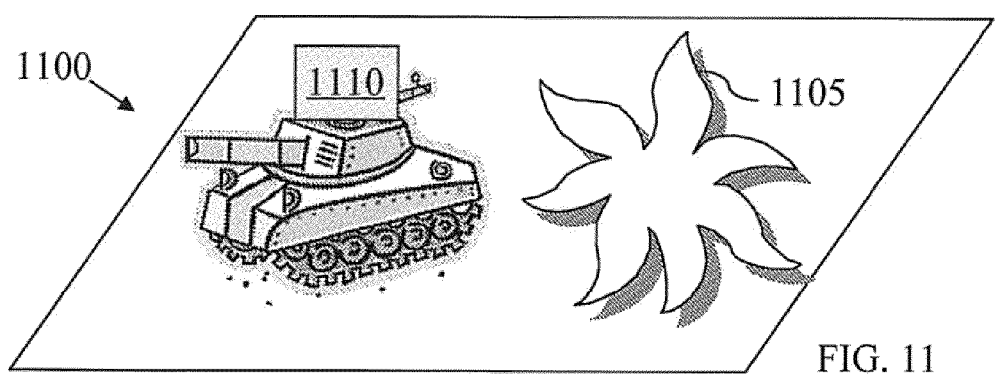
FIG. 11 illustrates an exemplary scenario for using battle-field-based biomass treatment unit.

FIG. 11 illustrates an exemplary scenario 1100 for using battlefield-based biomass treatment unit 1110. The exemplary scenario 1100 includes a biomass source 1105 (e.g., any vegetation adjacent or proximate to a battlefield or military operation, whether tropical, arid, coastal, mountainous, desert, or other environment) and a treatment unit 1110 (e.g., a first module and a second module on a military, paramilitary, or civilian vehicle, compound, site, structure, and the like) adjacent to the biomass source 1105. In this context battlefield-based can include any military or para-military mission including aid, support, rebuilding, and the like.

A battlefield-based biomass treatment unit including a first module and a second module can convert biomass into a biocrude at a site adjacent to a battlefield (or other military or paramilitary mission). The first module has a pretreater and a first frame for transportation to and operation at a site adjacent to a battlefield. The pretreater is operable to process biomass to produce a biomass preparation for conversion into a biocrude. The first frame supports the pretreater during transportation to and operation at the battlefield. The second module has a reactor, a separator, and a second frame for transportation to and operation at the battlefield. The reactor is operable to deoxygenate the biomass preparation, to produce a liquefied product. The separator is operable to separate a biocrude for conversion into a fuel or specialty chemical from the liquefied product. And, the second frame supports the reactor and separator during transportation to and operation at the battlefield.

The battlefield-based biomass treatment unit can also include a third module having a second reactor, a second separator, and a third frame for transportation to and operation at the battlefield. The second reactor is operable to refine the biocrude to produce a refined product, deoxygenate remaining biomass preparation to produce additional liquefied product, or both refine the biocrude and deoxygenate remaining biomass preparation. The second separator is operable to separate a fuel or specialty chemical from the refined product, separate a biocrude for conversion into a fuel or specialty chemical from the liquefied product, or both separate a fuel or specialty chemical and separate a biocrude. And, the third frame supports the second reactor and the second separator during transportation to and operation at the battlefield.

It can be advantageous for the separator and/or second separator to include a fractionator (e.g., tower), so the treatment unit can produce fuel on-site (e.g., to fuel military vehicles).

While the invention has been particularly shown and described with reference to specific embodiments, it should be understood by those skilled in the art that various changes in form and detail may be made without departing from the spirit and scope of the invention as defined by the appended claims.

What is claimed is:

1. A modular biomass treatment unit comprising:
   a first module comprising a pretreater and a first frame for transportation to and operation at a site adjacent to a solid biomass growth source;
   wherein the pretreater is operable to process solid biomass to produce a plurality of solid biomass particles for conversion into a fuel or specialty chemical;
   wherein the first frame supports the pretreater during transportation to and operation at the site adjacent to the solid biomass growth source;
   a second module comprising a reactor and a second frame for transportation to and operation at the site adjacent to the solid biomass growth source;
   wherein the reactor is operable to deoxygenate the plurality of solid biomass particles, to produce a liquefied product comprising a biocrude;
   wherein the second frame supports the reactor during transportation to and operation at the site adjacent to the solid biomass growth source;
   a third module comprising a second reactor and a third frame for transportation to and operation at the site adjacent to the solid biomass growth source;
   wherein the second reactor is operable to refine the biocrude to produce a refined product, deoxygenate remaining solid biomass to produce additional liquefied product, or both refine the biocrude and deoxygenate remaining solid biomass;
   wherein the third frame supports the second reactor during transportation to and operation at the site adjacent to the solid biomass growth source.

2. The modular biomass treatment unit of claim 1, wherein the pretreater comprises a contactor adapted for one or more of forming a mechano-chemical interaction between at least a portion of the solid biomass particles and a catalyst, and impregnating at least a portion of the solid biomass particles with a catalyst.

3. The modular biomass treatment unit of claim 1, wherein the pretreater comprises one or more of a demineralizer adapted for removing minerals from the solid biomass, and a dryer adapted for dewatering and torrifying the solid biomass.

4. The modular biomass treatment unit of claim 1, further comprising a solid biomass harvester.

5. The modular biomass treatment unit of claim 1, wherein the first module comprises skids and is sized to fit within one or more shipping containers.

6. The modular biomass treatment unit of claim 1, wherein the second module further comprises
   a separator which is operable to separate the biocrude for conversion into a fuel or specialty chemical from the liquefied product; and
   wherein the second frame further supports the separator during transportation to and operation at the site adjacent to the solid biomass growth source.

7. The modular biomass treatment unit of claim 6, wherein the third module further comprises
   a second separator which is operable to separate a fuel or specialty chemical from the refined product, separate the biocrude for conversion into a fuel or specialty chemical from the liquefied product, or both separate a fuel or specialty chemical from the refined product and separate the biocrude; and
   wherein the third frame further supports the second separator during transportation to and operation at the site adjacent to the solid biomass growth source.

8. The modular biomass treatment unit of claim 1, wherein the second module comprises a coupling mechanism for detachably engaging with the first module, comprises skids, and is sized to fit within one or more shipping containers.

9. The modular biomass treatment unit of claim 1, wherein the third module comprises a coupling mechanism for detachably engaging with one or more of the first module and the second module, comprises skids, and is sized to fit within one or more shipping containers.

10. The modular biomass treatment unit of claim 1, wherein the pretreater further comprises a vessel for roasting or toasting biomass.

11. A method for treating solid biomass at one or more sites adjacent to a solid biomass growth source comprising:
   receiving one or more first modules, each module comprising a pretreater supported by a frame, at one or more sites adjacent to a solid biomass growth source;
   connecting the one or more first modules to utilities at the one or more sites adjacent to the solid biomass growth source;
   processing solid biomass from the solid biomass growth source in the one or more pretreaters supported by first frames, to produce a plurality of solid biomass particles for conversion into a fuel or specialty chemical; and
   wherein each pretreater comprises a dryer adapted for dewatering and torrifying the solid biomass; and further comprises a component selected from the group consisting of:
   a) a contactor adapted for one or more of forming a mechano-chemical interaction between at least a portion of the solid biomass particles and a catalyst, and impregnating at least a portion of the solid biomass particles with a catalyst;
   b) a demineralizer adapted for removing minerals from the solid biomass; and
   c) both a) and b).

12. The method of claim 11, further comprising:
   processing the plurality of solid biomass particles and a catalyst in a conventional petroleum refinery unit, wherein the catalyst and the unit are each adapted for processing solid biomass particles; or
   co-processing the plurality of solid biomass particles, a catalyst, and a conventional petroleum-based feedstock in a conventional petroleum refinery unit, wherein the catalyst and the unit are each adapted for co-processing solid biomass particles and a conventional petroleum based feedstock.

13. The method of claim 11, wherein processing the solid biomass comprises roasting or toasting the solid biomass.

14. A method for treating solid biomass at a site adjacent to a solid biomass growth source comprising:
   receiving a first module comprising a pretreater supported by a first frame at a site adjacent to a solid biomass growth source;
   connecting the first module to utilities at the site adjacent to the solid biomass growthsource;
   processing solid biomass from the solid biomass growth source in the pretreater supported by the first frame, to produce a plurality of solid biomass particles for conversion into a fuel or specialty chemical; and
   wherein the pretreater comprises a dryer adapted for dewatering and torrifying the solid biomass; and further comprises a component selected from the group consisting of:
   a) a contactor adapted for one or more of forming a mechano-chemical interaction between at least a portion of the solid biomass particles and a catalyst, and impregnating at least a portion of the solid biomass particles with a catalyst;
   b) a demineralizer adapted for removing minerals from the solid biomass; and
   c) both a) and b).

15. The method of claim 14, further comprising:
   receiving a second module comprising a reactor and a separator supported by a second frame at a second site, the second site adjacent to the solid biomass growth source or adjacent to
   a petroleum refinery;
   connecting the second module to utilities at the second site;
   deoxygenating the plurality of solid biomass particles in the reactor supported by the second frame to produce a liquefied product; and
   separating a biocrude for conversion into a fuel or specialty chemical from the liquefied product in the separator supported by the second frame.

16. The method of claim 15, further comprising:
   receiving a third module comprising a second reactor and a second separator supported by a third frame at the second site;
   connecting the third module to utilities at the second site;
   refining the biocrude in the second reactor supported by the third frame to produce a refined product, deoxygenating remaining solid biomass particles in the second reactor supported by the second frame to produce additional liquefied product, or both refining the biocrude and deoxygenating remaining solid biomass particles; and
   separating a fuel or specialty chemical from the refined product in the second separator or, separating the biocrude for conversion into a fuel or specialty chemical from the liquefied product in the second separator, or both separating a fuel or specialty chemical from the refined product and separating the biocrude in the second separator.

17. The method of claim 14, further comprising:
   receiving a second module comprising a reactor supported by a second frame at a second site, the second site adjacent to the solid biomass growth source or adjacent to a petroleum refinery;
   connecting the second module to utilities at the second site; and
   deoxygenating the plurality of solid biomass particles in the reactor supported by the second frame to produce a liquefied product comprising a biocrude.

18. The method of claim 17, further comprising:
   receiving a third module comprising a second reactor supported by a third frame at the second site;
   connecting the third module to utilities at the second site; and
   refining the biocrude of the liquefied product in the second reactor to produce a refined product, deoxygenating remaining solid biomass particles in the second reactor to produce additional liquefied product, or both refining the biocrude and deoxygenating remaining solid biomass particles in the second reactor.

19. A method for treating solid biomass from a solid biomass growth source comprising:
   receiving a first module comprising a pretreater supported by a first frame at a first site adjacent to a first sector of a solid biomass growth source;
   connecting the first module to utilities at the first site;
   processing solid biomass from the first sector in the pretreater to produce a first plurality of solid biomass particles for conversion into a fuel or specialty chemical;
   receiving the first module at a second site adjacent to a second sector of the solid biomass growth source;
   connecting the first module to utilities at the second site;
   processing solid biomass from the second sector in the pretreater to produce a second plurality of solid biomass particles for conversion into a fuel or specialty chemical; and wherein the pretreater comprises a dryer adapted for dewatering and torrifying the solid biomass; and further comprises a component selected from the group consisting of:
a) a contactor adapted for one or more of forming a mechano-chemical interaction between at least a portion of the solid biomass particles and a catalyst, and impregnating at least a portion of the solid biomass particles with a catalyst;
b) a demineralizer adapted for removing minerals from the solid biomass; and
c) both a) and b).

20. The method of claim 19, further comprising:
receiving a second module comprising a reactor and a separator supported by a second frame at the first site;
connecting the second module to utilities at the first site;
deoxygenating the first plurality of solid biomass particles in the reactor, to produce a first liquefied product;
separating a first biocrude for conversion into a fuel or specialty chemical from the first liquefied product in the separator;
receiving the second module at the second site;
connecting the second module to utilities at the second site;
deoxygenating the second plurality of solid biomass particles in the reactor to produce a second liquefied product; and
separating a second biocrude for conversion into a fuel or specialty chemical from the second liquefied product in the separator.

21. The method of claim 19, further comprising:
receiving a second module comprising a reactor supported by a second frame at the first site;
connecting the second module to utilities at the first site;
deoxygenating the first plurality of solid biomass particles in the reactor, to produce a first liquefied product;
receiving the second module at the second site;
connecting the second module to utilities at the second site; and
deoxygenating the second plurality of solid biomass particles in the reactor to produce a second liquefied product.

22. A method for treating solid biomass from a solid biomass growth source comprising:
receiving a first module comprising a first pretreater supported by a first frame at a first site adjacent to a first sector of a solid biomass growth source;
connecting the first module to utilities at the first site;
processing solid biomass from the first sector in the first pretreater, to produce a first plurality of solid biomass particles for conversion into a fuel or specialty chemical;
receiving a second module comprising a second pretreater supported by a second frame at a second site adjacent to a second sector of the solid biomass growth source;
connecting the second module to utilities at the second site;
processing solid biomass from the second sector in the second pretreater, to produce a second plurality of solid biomass particles for conversion into a fuel or specialty chemical; and
receiving the first and second plurality of solid biomass particles in a reactor, deoxygenating the first and second plurality of solid biomass particles in the reactor to produce a liquefied product;
wherein the first and second pretreaters each comprise a dryer adapted for dewatering and torrifying the solid biomass; and further comprise a component selected from the group consisting of:
a) a contactor adapted for one or more of forming a mechano-chemical interaction between at least a portion of the solid biomass particles and a catalyst, and impregnating at least a portion of the solid biomass particles with a catalyst;
b) a demineralizer adapted for removing minerals from the solid biomass; and
c) both a) and b).

23. The method of claim 22 further comprising separating a biocrude for conversion into a fuel or specialty chemical from the liquefied product.

24. A water-based biomass treatment unit for converting algae or other aquatic biomass into a biocrude at a site adjacent to an aquatic biomass source comprising:
a first module comprising a pretreater and a first frame for transportation to and operation at a site adjacent to an aquatic biomass source;
wherein the pretreater is operable to process aquatic biomass to produce an aquatic biomass preparation for conversion into a biocrude;
wherein the first frame supports the pretreater during transportation to and operation at the site adjacent to the aquatic biomass source;
a second module comprising a reactor, a separator, and a second frame for transportation to and operation at the site adjacent to the aquatic biomass source;
wherein the reactor is operable to deoxygenate the aquatic biomass preparation, to produce a liquefied product;
wherein the separator is operable to separate a biocrude for conversion into a fuel or specialty chemical from the liquefied product; and
wherein the second frame supports the reactor and separator during transportation to and operation at the site adjacent to the aquatic biomass source.

25. The water-based biomass treatment unit of claim 24, further comprising:
a third module comprising a second reactor, a second separator, and a third frame for transportation to and operation at the site adjacent to the aquatic biomass;
wherein the second reactor is operable to refine the biocrude to produce a refined product, deoxygenate remaining aquatic biomass preparation to produce additional liquefied product, or both refine the biocrude and deoxygenate remaining aquatic biomass preparation;
wherein the second separator is operable to separate a fuel or specialty chemical from the refined product, separate a biocrude for conversion into a fuel or specialty chemical from the liquefied product, or both separate a fuel or specialty chemical from the refined product and separate a biocrude; and
wherein the third frame supports the second reactor and the second separator during transportation to and operation at the site adjacent to the aquatic biomass source.

26. A battlefield-based biomass treatment unit for converting biomass into a biocrude at a site adjacent to a battlefield comprising:
a first module comprising a pretreater and a first frame for transportation to and operation at a site adjacent to a battlefield;
wherein the pretreater is operable to process biomass to produce a biomass preparation for conversion into a biocrude;
wherein the pretreater comprises a dryer adapted for dewatering and torrifying the solid biomass; and further comprises a component selected from the Group consisting of:

a) a contactor adapted for one or more of forming a mechano-chemical interaction between at least a portion of the solid biomass particles and a catalyst, and impregnating at least a portion of the solid biomass particles with a catalyst;
b) a demineralizer adapted for removing minerals from the solid biomass; and
c) both a) and b);
wherein the first frame supports the pretreater during transportation to and operation at the battlefield;
a second module comprising a reactor, a separator, and a second frame for transportation to and operation at the battlefield;
wherein the reactor is operable to deoxygenate the biomass preparation, to produce a liquefied product;
wherein the separator is operable to separate a biocrude for conversion into a fuel or specialty chemical from the liquefied product; and
wherein the second frame supports the reactor and separator during transportation to and operation at the battlefield.

27. The battlefield-based biomass treatment unit of claim 26, further comprising:
a third module comprising a second reactor, a second separator, and a third frame for transportation to and operation at the battlefield;
wherein the second reactor is operable to refine the biocrude to produce a refined product, deoxygenate remaining biomass preparation to produce additional liquefied product, or both refine the biocrude and deoxygenate remaining biomass preparation;
wherein the second separator is operable to separate a fuel or specialty chemical from the refined product, separate a biocrude for conversion into a fuel or specialty chemical from the liquefied product, or both separate a fuel or specialty chemical from the refined product and separate a biocrude; and
wherein the third frame supports the second reactor and the second separator during transportation to and operation at the battlefield.

* * * * *